(12) United States Patent
Okamoto

(10) Patent No.: US 9,489,295 B2
(45) Date of Patent: Nov. 8, 2016

(54) INFORMATION PROCESSING APPARATUS AND METHOD

(71) Applicant: FUJITSU LIMITED, Kawasaki-shi, Kanagawa (JP)

(72) Inventor: Takayuki Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/590,037

(22) Filed: Jan. 6, 2015

(65) Prior Publication Data

US 2015/0220447 A1    Aug. 6, 2015

(30) Foreign Application Priority Data

Jan. 31, 2014 (JP) .................................. 2014-017240

(51) Int. Cl.
*G06F 12/02* (2006.01)

(52) U.S. Cl.
CPC ................... *G06F 12/023* (2013.01)

(58) Field of Classification Search
CPC .......................... G06F 12/023; G06F 12/0253
USPC ................. 711/166, 170, 173, 203, 208, 209
See application file for complete search history.

(56) References Cited

U.S. PATENT DOCUMENTS

| | | | |
|---|---|---|---|
| 6,182,089 B1 * | 1/2001 | Ganapathy | G06F 12/023 |
| 6,658,437 B1 * | 12/2003 | Lehman | G06F 12/023 |
| 2008/0209154 A1 * | 8/2008 | Schneider | G06F 12/023 |
| | | | 711/170 |
| 2015/0089144 A1 * | 3/2015 | Bhattacharjee | G06F 12/023 |
| | | | 711/129 |

FOREIGN PATENT DOCUMENTS

| | | |
|---|---|---|
| JP | 11-3271 | 1/1999 |
| JP | 2006-48436 | 2/2006 |
| JP | 2006-215991 | 8/2006 |

* cited by examiner

*Primary Examiner* — Gary Portka
(74) *Attorney, Agent, or Firm* — Fujitsu Patent Center

(57) ABSTRACT

An information processing apparatus includes a free page storage unit and a page allocating unit. The free page storage unit divides a memory region in a memory into pages of a plurality of different page sizes and manages the divided pages, and stores management information about an initialization state corresponding to an unused memory region in the memory. The page allocating unit selects a free page of a page size according to a requested region size or a requested page size from the free page storage unit when an allocation of the unused memory region is requested, and performs an initializing process on a memory region on which the initializing process has not been performed in a memory region corresponding to the free page using management information about the selected free page.

24 Claims, 15 Drawing Sheets

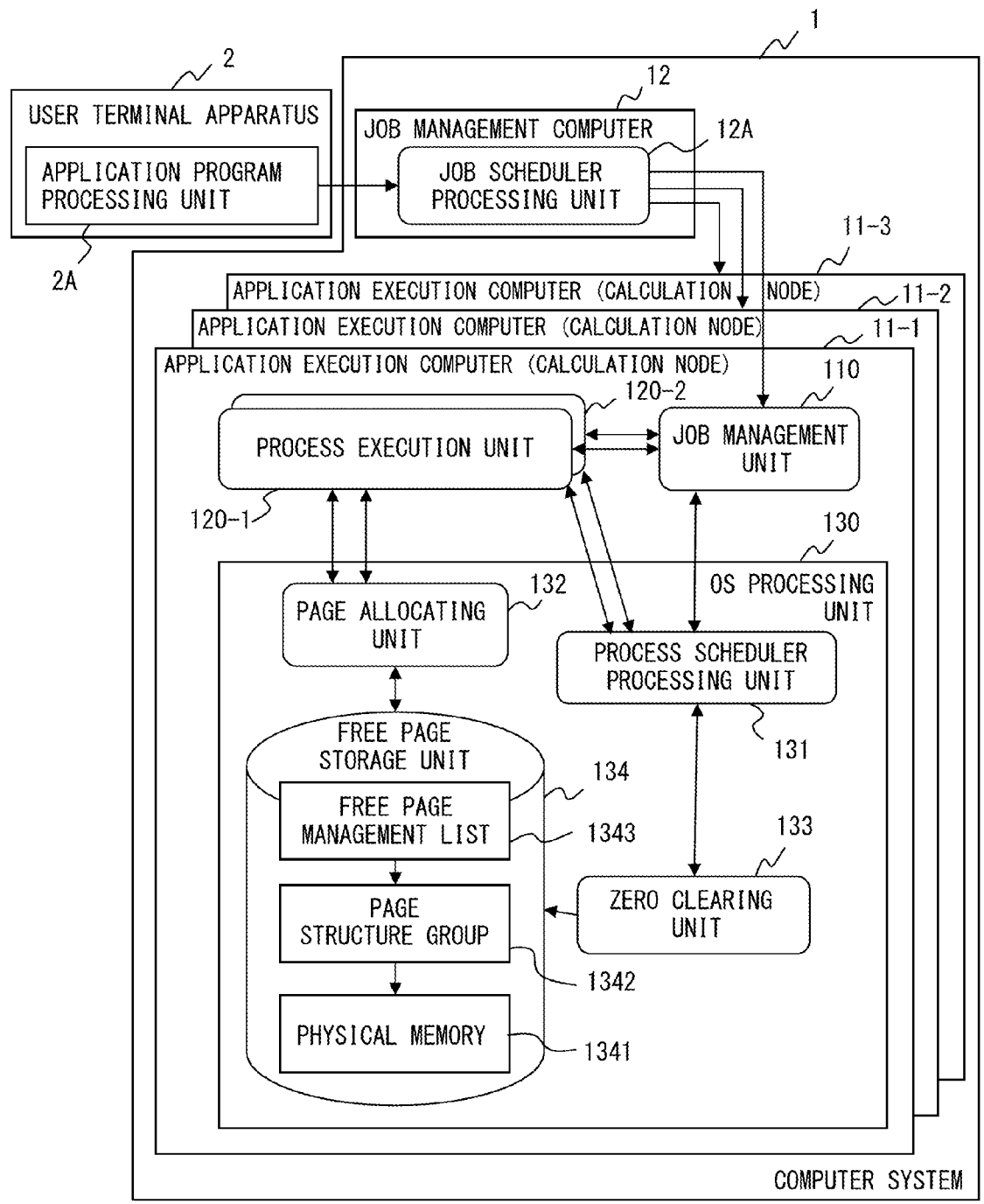
F I G. 1

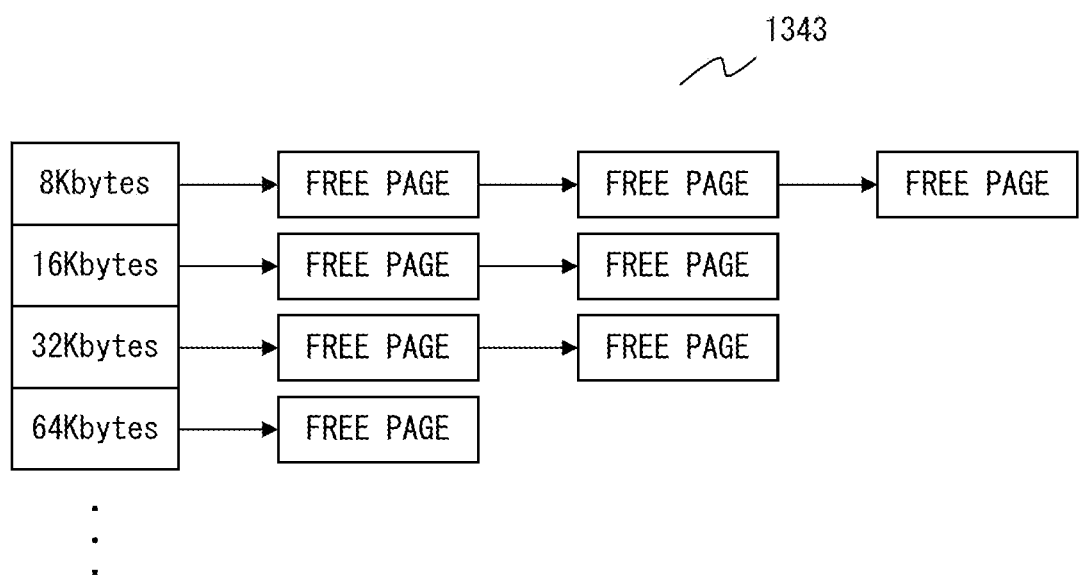
F I G. 3

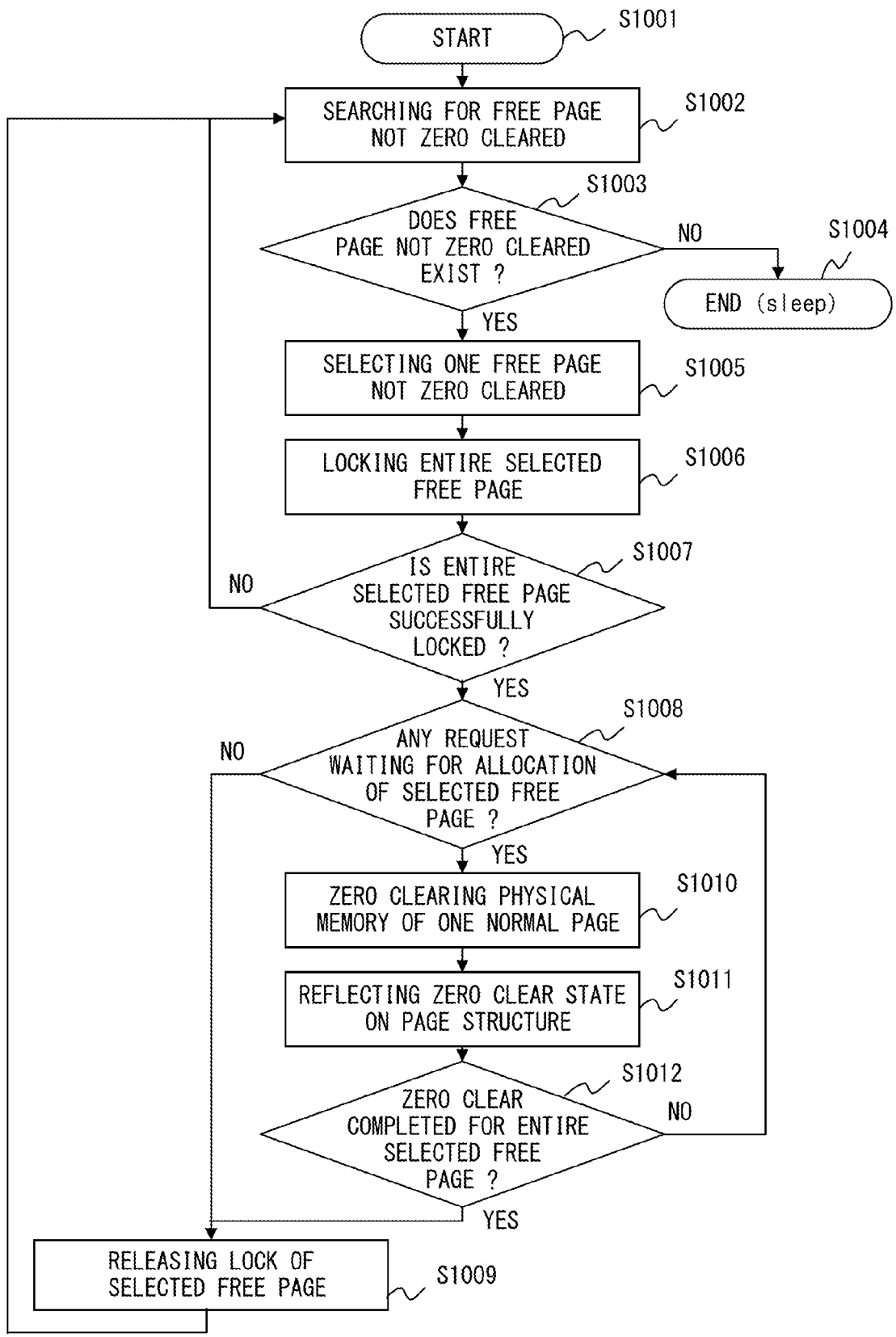
F I G. 5

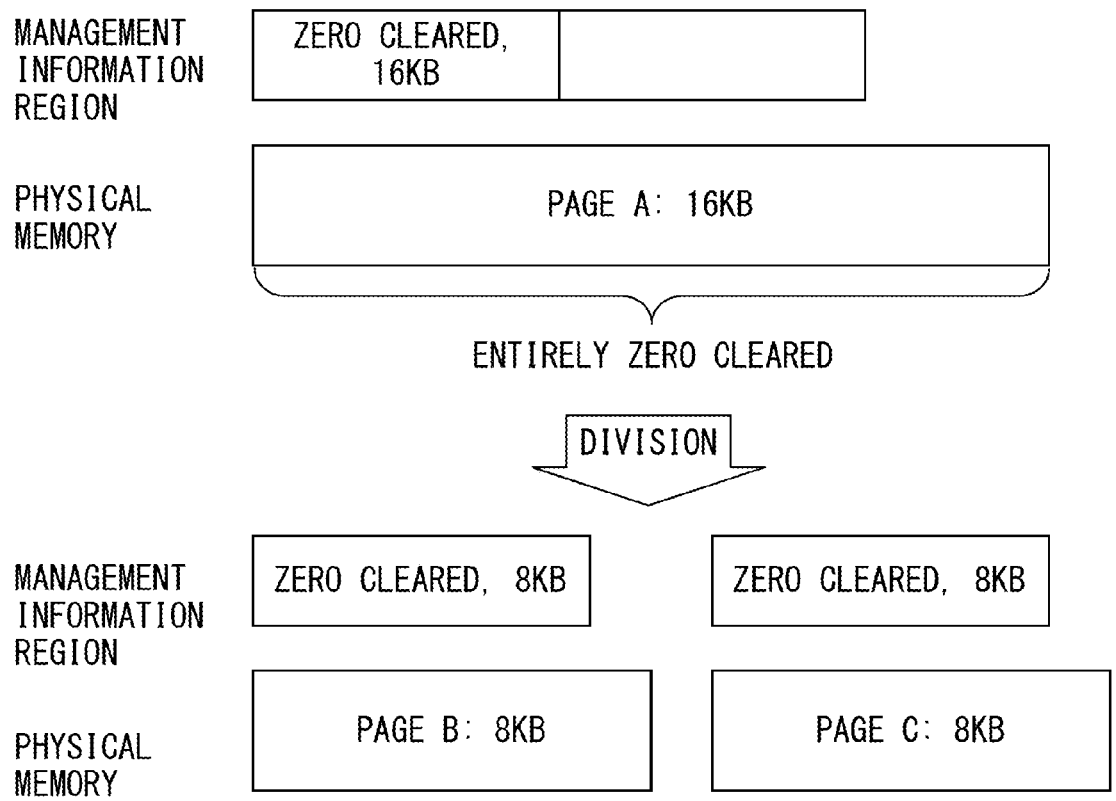
F I G. 8

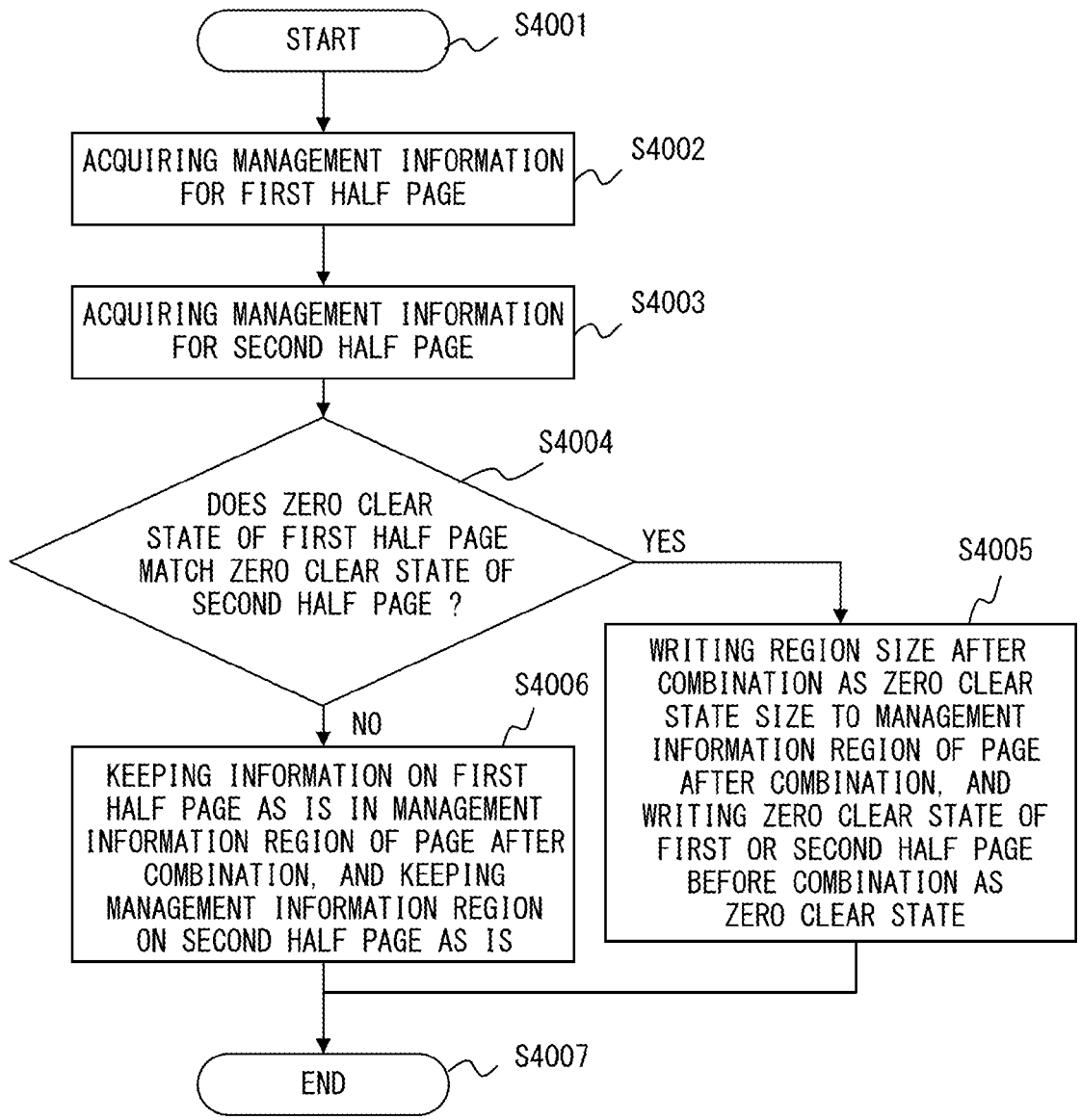
F I G. 1 0

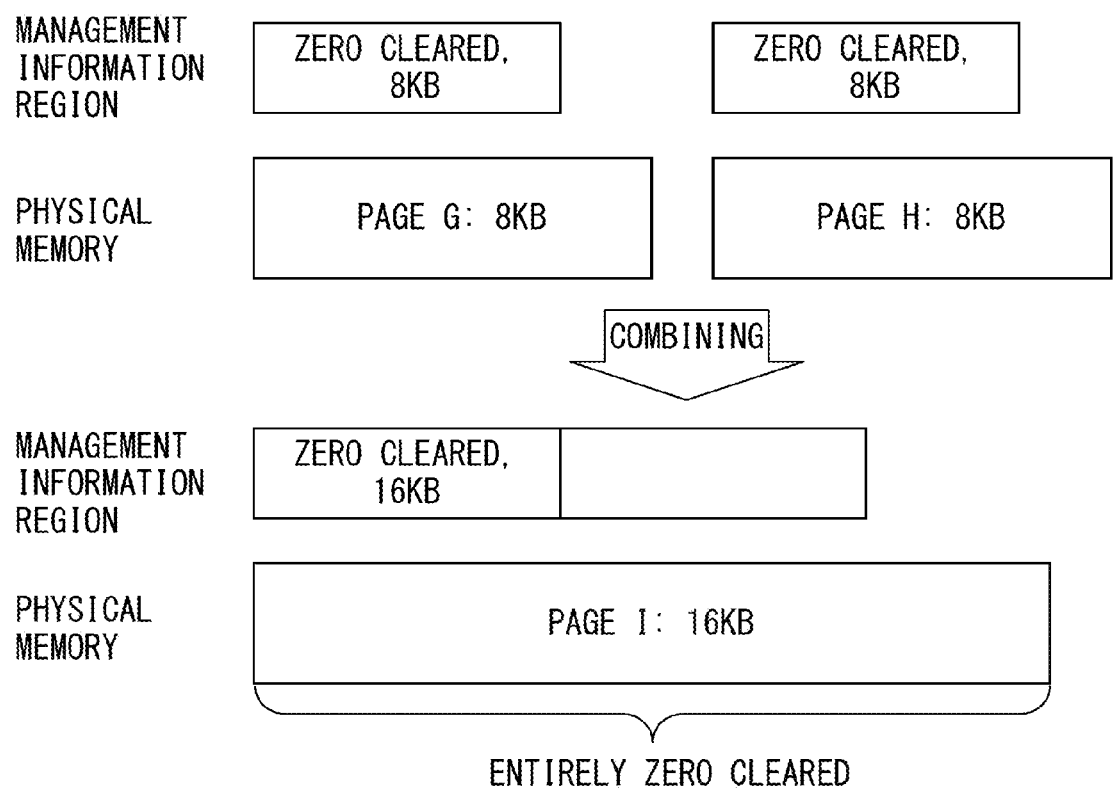
F I G. 1 1

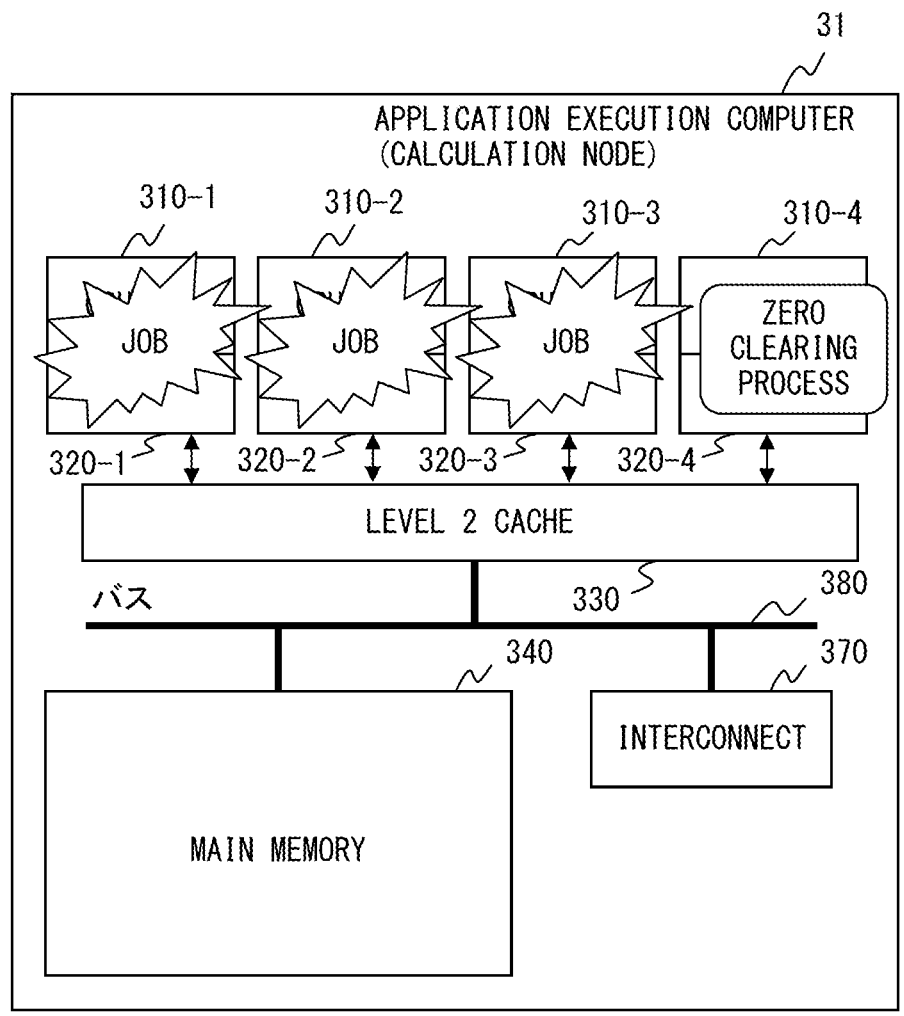
F I G. 1 5

INFORMATION PROCESSING APPARATUS AND METHOD

CROSS-REFERENCE TO RELATED APPLICATIONS

This application is based upon and claims the benefit of priority of the prior Japanese Patent Application No. 2014-017240, filed on Jan. 31, 2014, the entire contents of which are incorporated herein by reference.

FIELD

The present invention is related to an information processing apparatus, a control method executed by an information processing apparatus, and a control program for an information processing apparatus.

BACKGROUND

A processor which executes an Operating System (OS) implemented for a computer re-allocates a memory region freed up after the execution of a prior process or task as a memory region of memory for use in executing a new process or task which will operate with the OS. Before executing the re-allocation of such a memory region, the memory region is reinitialized to prevent the leakage of the information about the prior process or task left in the memory region to be re-allocated. However, there may be a case in which the initialization is not desired in allocating memory in the kernel of the OS, or a case in which a freed up memory region is not used in executing a new process in a specified valid duration such as a period up to the turning off of a power supply of a computer even though the freed up memory region has been initialized. Then, to control undesired execution of initialization, the reinitialization of a memory region may be performed when the re-allocation of a memory region is requested.

In the OS operated by a processor, the memory region in memory is managed by dividing it into units of pages, that is, into size (region size) units of specified consecutive memory regions. The size of a page managed by the OS may be 4 Kbytes or 8 Kbytes. Recently, depending on the type of OS or process or task operated under control of the OS, a page of which size is larger than a normal size of 4 Kbytes or 8 Kbytes, for example a page in units of Mbytes, has been used. In the following explanation, a page of a normal size such as 4 Kbytes or 8 Kbytes is referred to as a normal page for convenience, and a page of which size is larger than the normal size is referred to as a large page for convenience. When a memory region in memory is managed using a large page, the number of pages requested for using memory of the same size is smaller than in the case where a normal page is used, thereby reducing the page management costs. Therefore, when a large page is used in managing the memory region within the memory, an occurrence of a malfunction such as an erroneous Translation Lookaside Buffer (TLB, address conversion buffer) may be reduced, and the performance of the application may be improved.

However, when a large page of a single size is used in managing the memory region in memory, the effectively available amount of memory may be decreased. For example, if a program of 64 Kbytes is executed in the case where a memory region within the memory is managed using a large page of 4 Mbytes, then it becomes necessary to allocate a memory region of 4 Mbytes for one page to the execution of the program even though the size of the program is only 64 Kbytes.

Therefore, memory may be more effectively used if pages of different sizes are available in accordance with use. A method for efficiently managing memory blocks of different of sizes may be a buddy system, which is used in a Linux kernel and elsewhere. In the buddy system, a plurality of consecutive pages are combined with pages of larger sizes, and a large page is divided into smaller pages, thereby variably controlling a page size. By the execution of the combination and the division of pages, a memory region of an appropriate region size is allocated in accordance with the executed process or task.

The following page allocation system is known. Relating to the memory managed in a page unit, an unsecure page for which it is necessary to prevent the leakage of data is detected when a page acquisition request is issued from an application, when a page is freed up from the application, or when data is set for a page from the application which has secured a page. Then, only the detected unsecure page is initialized.

In addition, the following memory allocation system is known. A system load monitor mechanism monitors the load state of a computer system, and when it determines that the system load is low, it activates a page zero-clear mechanism. The page zero-clear mechanism retrieves from a free page pool a page to be allocated at the next request, zero clears the contents, and transfers the page to a zero clear page pool. When the page zero-clear mechanism determines that a zero cleared page is requested, it returns to a requester the page retrieved from the zero cleared page pool prepared by the page zero-clear mechanism.

Furthermore, the following microprocessor system is known. A microprocessor specifies the leading address and the size to be initialized in the memory. A DMA controller initializes the memory by transferring the initialization data to all addresses to be initialized in the memory having the leading address and the size specified. When the memory is initialized by the DMA transfer, the bit width of the initialization data output from the initialization data register is expanded in the bit width expansion circuit, and transferred to the memory through a data bus.

PATENT DOCUMENTS

Patent Document 1 Japanese Laid-open Patent Publication No. 2006-48436
Patent Document 2 Japanese Laid-open Patent Publication No. 11-3271
Patent Document 3 Japanese Laid-open Patent Publication No. 2006-215991

SUMMARY

According to an aspect of the embodiments, an information processing apparatus includes a free page storage unit and a page allocating unit. The free page storage unit divides a memory region in a memory into pages of a plurality of different page sizes and manages the divided pages, and stores management information about an initialization state corresponding to an unused memory region in the memory. The page allocating unit selects a free page of a page size according to a requested region size or a requested page size from the free page storage unit when an allocation of the unused memory region is requested, and performs an initializing process on a memory region on which the initializing process has not been performed in a memory region corresponding to the free page using management information about the selected free page.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional configuration of an exemplary computer system including an information processing apparatus according to an embodiment;

FIG. 3 is an example of a free page management list according to an embodiment;

FIG. 5 is an exemplary flow diagram of a zero clearing process performed by a zero clearing unit;

FIG. 8 is a first explanatory view of an updating process of the management information related to a dividing process;

FIG. 10 is an exemplary flow diagram of an updating process of the management information related to a combining process;

FIG. 11 is a first explanatory view of an updating process of the management information related to a combining process;

FIG. 15 is an explanatory view of a zero clearing process with a second timing.

BRIEF DESCRIPTION OF DRAWINGS

Figure 2:
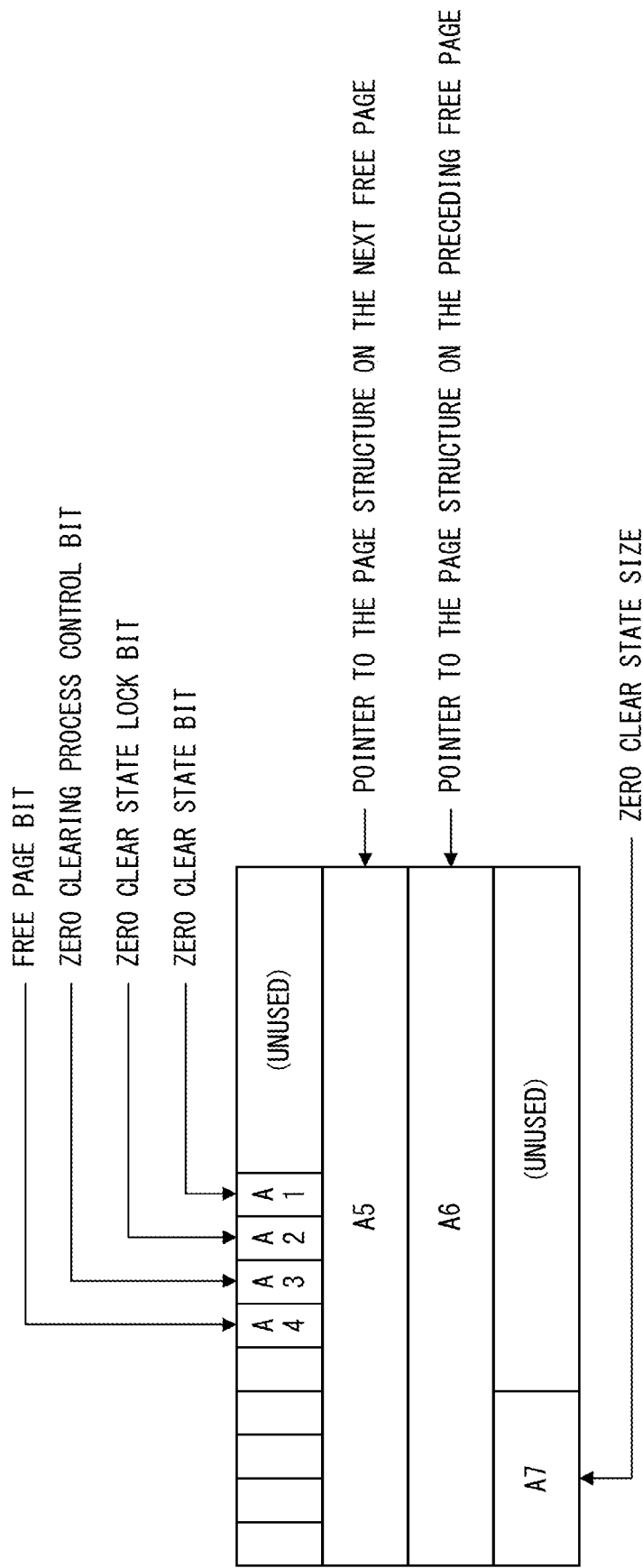
FIG. 2 is a schematic view of an exemplary page structure according to an embodiment.

The mode for embodying the present invention is described below with reference to the attached drawings.

The processing time desired for newly allocating a memory region in memory to a process or a task may depend on the number of pages corresponding to the region size of the memory requested to execute the process or the task, and the region size of the memory to be initialized for the allocation. In the case where the memory region of the memory is managed using a large page, the number of pages desired for the allocation may decrease more than in the case where the management is performed using a normal page. On the other hand, the region size of the memory to be initialized to allocate the memory region corresponding to the requested region size is the same as in the case where a normal page is used. As a result, in the case where the memory region within the memory is managed using a large page, the time period desired for the process of initializing the memory region within the memory may be a predominant time period in the processing time desired for newly allocating a memory region corresponding to 1 page to a process or a task.

Furthermore, if the initializing process on a memory region is performed on each page to be allocated when the memory region is allocated, then the time requested in one memory allocating process using a large page will be longer than the time in the case where a normal page is used.

For the reason described above, when a memory region in memory is managed using a large page, it may undesirably affect the performance or the behavior of the entire parallel computer system including a plurality of calculation nodes, depending on the length of the time desired for a memory allocating process including an initializing process on the memory region.

For example, the time taken for the initializing process performed in allocating memory in a calculation node may be a length of time equal to or greater than the communication time between calculation nodes in a computer system. In this case, if a plurality of calculation nodes simultaneously perform communications via an Application Programming Interface (API) such as a Message Passing Interface (MPI), etc., a delay due to a wait for initialization of memory occurs in the relaying operation between a portion of the calculation nodes. The influence of the occurrence of the delay reaches all calculation nodes, thereby causing a delay in the entire process.

Furthermore, in the process including an interprocess communication such as the above-mentioned communication between the calculation nodes, the time-out period up to the reply of the process of a communication partner may be set with the worst case taken into account. Then, the time-out period may be requested for setting to be sufficiently long with the above-mentioned initialization wait time of memory taken into account.

As described below in detail, an information processing apparatus according to the embodiment invention manages a memory region in memory using pages of a plurality of different page sizes. For example, the information processing apparatus according to the embodiment manages the initialization state (zero clear state) of the memory region which corresponds to each page within the memory using management information of each page. The information processing apparatus according to the embodiment performs the initializing process on the memory region which corresponds to each page within the memory using management information of each page. By the above-mentioned management of the initializing state and the execution of the initializing process, the time desired for performing the initializing process on the memory region when a memory region within the memory is allocated is reduced, and the allocating process of a memory region in accordance with the requested region size is performed at a high speed. In the following explanation, the term "zero clear" refers to initialization.

FIG. 1 is a functional configuration of an exemplary computer system including an information processing apparatus according to an embodiment.

As illustrated in FIG. 1, a computer system 1 includes application execution computers 11-1 through 11-3 and a job management computer 12. The computer system 1 is connected to a user terminal apparatus 2 through the job management computer 12. The computer system 1 executes an application program, a source code, an execution binary, etc. specified by an application program processing unit 2A of the user terminal apparatus 2. In the following explanation, unless otherwise specified, the term "application program" refers to, for convenience, an application program, a source code, an execution binary, etc. executed by the computer system 1 at an instruction from the user terminal apparatus 2.

The job management computer 12 includes a job scheduler processing unit 12A. The job scheduler processing unit 12A manages a schedule for allowing any of the application execution computers 11-1 through 11-3 to perform a job of the application program specified by the user terminal apparatus 2.

The application execution computers 11-1 through 11-3 execute respective jobs of the application program specified by the job management computer 12. The application execution computers 11-1 through 11-3 are calculation nodes of the computer system 1, and are examples of an information processing apparatus according to the embodiment. In FIG. 1, three application execution computers 11-1 through 11-3 are illustrated, but the number of application execution computers included in the computer system 1 may be optional. In the following explanation, unless otherwise specified, the application execution computers 11-1 through 11-3 are described as an application execution computer 11.

The application execution computer 11 includes a job management unit 110, process execution units 120-1 and 120-2, and an Operating System (OS) processing unit 130. In FIG. 1, two process execution units 120-1 and 120-2 are illustrated, but the number of process execution units included in the application execution computer 11 may be optional. In the following explanation, unless otherwise specified, the process execution units 120-1 and 120-2 are described as a process execution unit 120.

The job management unit 110 is connected to the job scheduler processing unit 12A, the process execution unit 120, and the OS processing unit 130. In cooperation with the job scheduler processing unit 12A, the job management unit 110 manages the entire job which is executed in the application execution computer 11 and which includes scheduling for executing a job of an application program, monitoring of the execution state of a job, reporting the execution state of a job, etc. The job scheduler processing unit 12A and the job management unit 110 configure a job scheduling system of the computer system 1.

The process execution unit 120 performs the process of an application program specified by the job management unit 110 using a memory region of the memory allocated by the OS processing unit 130. The process execution unit 120 performs the process of the application program specified by the job management unit 110 according to the schedule specified by the OS processing unit 130.

The OS processing unit 130 executes the OS implemented in the application execution computer 11. The OS processing unit 130 includes a process scheduler processing unit 131, a page allocating unit 132, a zero clearing unit 133, and a free-page storage unit 134.

The process scheduler processing unit 131 is connected to the job management unit 110, the process execution unit 120, and the zero clearing unit 133. In cooperation with the job management unit 110, the process scheduler processing unit 131 manages the schedule of the execution of the process of the application program by the process execution unit 120 and the execution of the zero clearing process on a free page by the zero clearing unit 133.

The page allocating unit 132 is connected to the process execution unit 120. The page allocating unit 132 receives a request to allocate a memory region within the memory from the process execution unit 120. The request to allocate the memory region may be configured to request a region size of memory desired for executing the process, or to request a page size desired for executing the process. The page allocating unit 132 searches the free page storage unit 134 for a free page of the page size corresponding to the region size of the memory requested from the process execution unit 120, or a free page corresponding to the page size requested from the process execution unit 120. The page allocating unit 132 determines whether or not the searched for free page has been zero cleared. When the searched for free page is not a zero cleared page as a result of the determination, the page allocating unit 132 zero clears the memory region corresponding to the searched for free page. The page allocating unit 132 passes the zero cleared memory region to the process execution unit 120.

The zero clearing unit 133 is connected to the process scheduler processing unit 131 and the free page storage unit 134. The zero clearing unit 133 acquires a free page in the free page storage unit 134 according to the schedule by the process scheduler processing unit 131. The zero clearing unit 133 determines whether or not the memory region which corresponds to the acquired free page within the memory has been zero cleared. When the memory region corresponding to the acquired free page is a memory region which has not been zero cleared as a result of the determination, then the zero clearing unit 133 zero clears the memory region which has not been zero cleared.

The free page storage unit 134 manages the free page corresponding to the memory region which is not being used in executing the process of the application program by the process execution unit 120 etc. within the memory. The free page storage unit 134 includes a physical memory 1341, a page structure group 1342, and a free page management list 1343.

The physical memory 1341 is a physical memory managed by dividing it into pages of a plurality of different page sizes, and is an entity of pages. Unless otherwise described, the term "memory" is a synonym for the term "physical memory".

The page structure group 1342 is a set of page structures for management of the information relating to a page. A page structure is set in a page unit of the smallest page size in the pages of plural sizes to be managed, that is, in a normal page unit. A normal page is a page in a size of, for example, 4 Kbytes or 8 Kbytes. Each page structure set in a normal page unit corresponds to the memory region of a specified address within the memory.

In each page structure, information about a corresponding normal page or a large page including one corresponding normal page. That is, the information about a normal page is stored in a corresponding page structure, and the information about a large page is stored in at least one of corresponding page structures for each of normal pages obtained by dividing a large page. FIG. 2 is a schematic view of an exemplary page structure according to an embodiment.

As illustrated in FIG. 2, a page structure 1342A according to the embodiment includes a zero clear state bit A1, a zero clear state lock bit A2, a zero clearing process control bit A3, and a free page bit A4. The page structure 1342A includes a pointer A5 to the page structure on the next free page and a pointer A6 to the page structure on the preceding free page. The page structure 1342A includes a zero clear state size A7.

The zero clear state bit A1 is a bit indicating whether or not the page corresponding to the page structure 1342A (a corresponding normal page or a large page including one corresponding normal page) is a zero cleared page. The zero clear state lock bit A2 is a bit on which a flag is set for the zero clearing unit 133 to exclusively perform the zero clearing process on the page corresponding to the page structure 1342A. The zero clearing process control bit A3 is a bit for controlling whether or not the zero clearing process by the zero clearing unit 133 on the page corresponding to the page structure 1342A is allowed. The free page bit A4 is a bit indicating whether or not the page corresponding to the page structure 1342A is a free page. Each of the flags A1 through A4 is, for example, one bit, and the entire flag may be not more than 64 bits.

The pointer A5 to the page structure on the next free page and the pointer A6 to the page structure on the preceding free page are pointers to the page structure 1342A of the adjacent free page connected to the page structure 1342A in the free page management list 1343. The pointer AS to the page structure on the next free page and the pointer A6 to the page structure on the preceding free page may be, for example, 64 bits.

The zero clear state size A7 is a bit indicating the length of the consecutive zero clear state within the memory region corresponding to the page. That is, the zero clear state size A7 is a bit indicating the size of the consecutive zero cleared region of the page (a corresponding normal page or a large page including one corresponding normal page) corresponding to the page structure 1342A. The zero clear state size A7 is expressed by a power of two of the page size of a normal page, for example, 8 bits.

In the information processing apparatus according to the embodiment, the allocating process of the memory region performed by the page allocating unit 132 and the zero clearing process of the memory region performed by the zero clearing unit 133 are controlled using the information in the page structure 1342A. For example, using the zero clear state lock bit A2 and the zero clearing process control bit A3, control is performed so that the processes by the page allocating unit 132 and the zero clearing unit 133 are not to be simultaneously performed on the same free page (a memory region corresponding to the same free page). In the memory region corresponding to a free page within the memory, a memory region on which a zero clearing process has not been performed, that is, a memory region on which the zero clearing process is to be performed, is identified using the zero clear state bit A1, a free page bit A4, and a zero clear state size A7.

The free page management list 1343 is a list for management of a free page corresponding to an unused memory region which is not used in executing a process of an application program by the process execution unit 120. The page allocating unit 132 and the zero clearing unit 133 search for a free page and a memory region corresponding to the free page with reference to the free page management list 1343. FIG. 3 is an example of a free page management list according to an embodiment.

As illustrated in FIG. 3, an entry indicating a page size such as 8 Kbytes, 16 Kbytes, 32 Kbytes, 64 Kbytes, etc. is added to the first row of the free page management list 1343, and each of free pages having different page sizes is managed in association with an entry of a corresponding page size. In the example illustrated in FIG. 3, the size of a normal page is 8 Kbytes, and the page sizes of large pages are 16 Kbytes, 32 Kbytes, and 64 Kbytes. As indicated by the arrow illustrated in FIG. 3, free pages for each entry are combined with each other by the above-mentioned pointers A5 and A6 of the corresponding page management structures 1342A. Note that FIG. 3 is only an example of the free page management list 1343 according to the embodiment. That is, the size of a normal page may be any page size other than 8 Kbytes. Furthermore, the page size of a large page may be any page size other than 16 Kbytes, 32 Kbytes, and 64 Kbytes. The type of large page having different page sizes is not limited to these three types, but may be any type.

Figure 4:
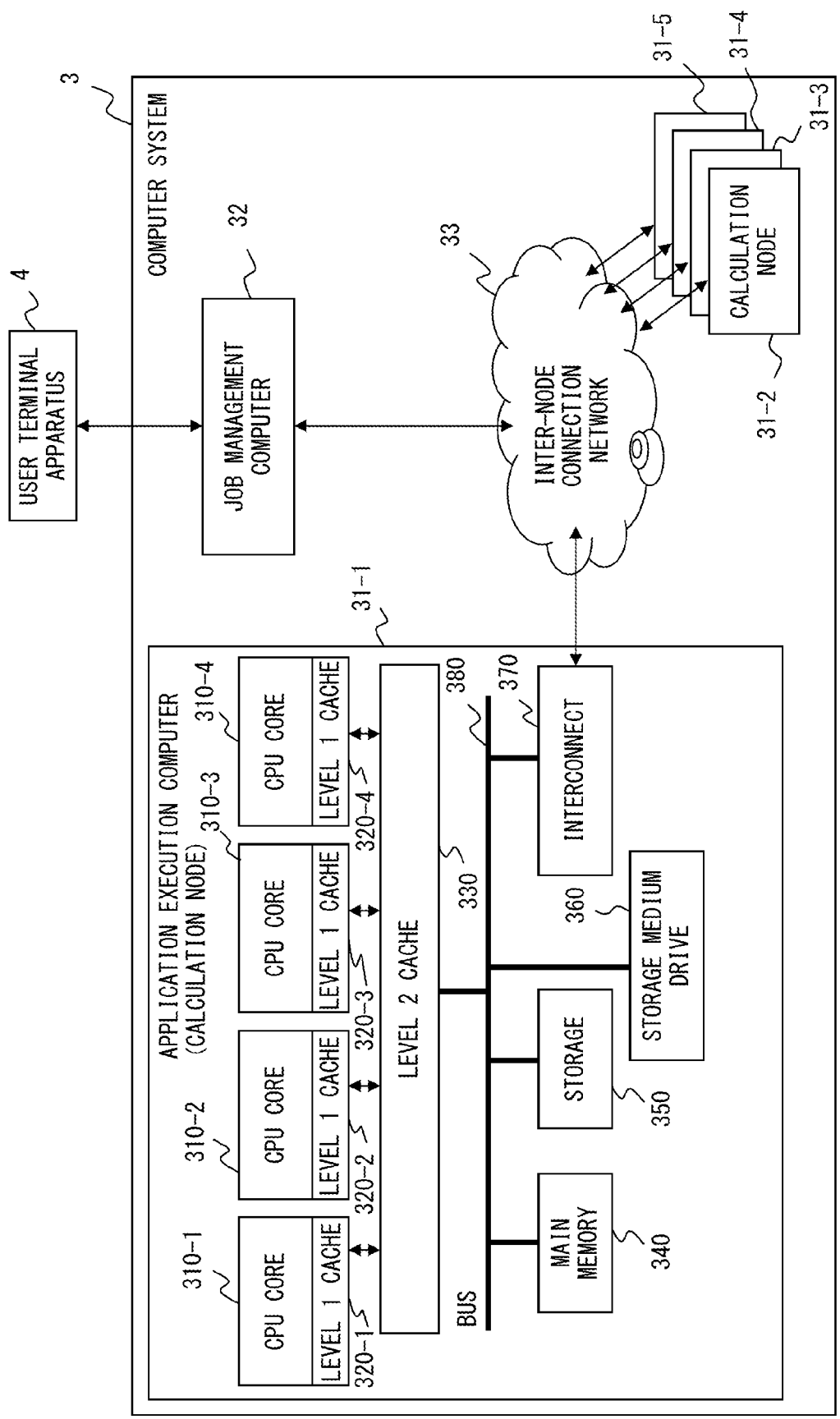
FIG. 4 is a hardware configuration of an exemplary computer system including an information processing apparatus according to an embodiment.

FIG. 4 is a hardware configuration of an exemplary computer system including an information processing apparatus according to an embodiment.

As illustrated in FIG. 4, a computer system 3 includes application execution computers 31-1 through 31-5, a job management computer 32, and an inter-node connection network 33. The computer system 3 is connected to a user terminal apparatus 4 such as a computer via the job management computer 32. Although FIG. 4 illustrates five application execution computers 31-1 through 31-5, there maybe any number of application execution computers included in the computer system 3. In the following explanation, when the application execution computers 31-1 through 31-5 are not specifically designated, an application execution computer 31 is described.

The job management computer 32 is an information processing apparatus such as a computer, and corresponds to the job management computer 12. The job scheduler processing unit 12A in the job management computer 12 is, for example, a Central Processing Unit (CPU) in the job management computer 32.

The application execution computer 31 is an information processing apparatus such as a computer, and corresponds to the application execution computer 11, which is an example of an information processing apparatus according to the embodiment. Each application execution computer 31 is a calculation node of the computer system 3.

As illustrated in FIG. 4, the application execution computer 31 includes Central Processing Unit (CPU) cores 310-1 through 310-4, level 1 (L1) caches 320-1 through 320-4, a level 2 (L2) cache 330, a main memory 340, a storage 350, a storage medium drive 360, an interconnect 370, and a bus 380. FIG. 4 illustrates four CPU cores 310-1 through 310-4, and four level 1 caches 320-1 through 320-4 corresponding to the four CPU cores 310-1 through 310-4. However, there may be any number of CPU cores included in the application execution computer 31 and the level 1 caches corresponding to the CPU cores. In the following explanation, when the CPU cores 310-1 through 310-4 are not specifically designated, the CPU core 310 is described. When the level 1 caches 320-1 through 320-4 are not specifically designated, the level 1 cache 320 is described.

The CPU core 310 is a core of a processor, and a logical circuit which performs an arithmetic process. Each CPU core 310 is connected to the corresponding level 1 cache 320 which may be accessed at a high speed, and is connected to the level 2 cache 330 shared by a plurality of CPU cores 310. The CPU core 310, the level 1 cache 320, and the level 2 cache 330 configure a multiprocessor. The CPU core 310, the level 1 cache 320, and the level 2 cache 330 correspond to the job management unit 110, the process execution unit 120, the process scheduler processing unit 131, the page allocating unit 132, and the zero clearing unit 133.

The main memory 340 temporarily stores a program being executed and the data being processed, and is directly accessed by the CPU core 310. The main memory 340 is, for example, Random Access Memory (RAM). The main memory 340 corresponds to the free page storage unit 134.

The storage 350 is, for example, a hard disk drive (HDD). The storage 350 stores a program such as an OS etc. and data.

The storage medium drive 360 reads data stored in a recording medium, and/or writes data processed in the application execution computer 31 into a recording medium. The recording medium may be, for example, Compact Disk Read Only Memory (CD-ROM), a Digital Versatile Disk (DVD), Universal Serial Bus (USB) memory, flash memory, etc.

The interconnect 370 is a communication device connected to the other node 31 and the job management computer 32 via the inter-node connection network 33.

The bus 380 interconnects a multiprocessor including the CPU core 310, the level 1 cache 320, and the level 2 cache 330, the main memory 340, the storage 350, the storage medium drive 360, and the interconnect 370. The bus 380 includes a memory bus which connects the multiprocessor including the CPU core 310, the level 1 cache 320, and the level 2 cache 330 to the main memory 340.

The inter-node connection network 33 is a cable and a switch which connects the job management computer 32 and the job management computer 32, and interconnects the application execution computers 31.

First, the zero clearing process performed by the zero clearing unit 133 is described. The zero clearing process refers to an initializing process on the memory region corresponding to a free page within the memory. FIG. 5 is an exemplary flow diagram of a zero clearing process performed by a zero clearing unit.

When the zero clearing unit 133 starts the zero clearing process in accordance with an instruction from the process scheduler processing unit 131 (step S1001), the zero clearing unit 133 refers to the free page management list 1343 so as to search for a free page not yet zero cleared (step S1002). In particular, with reference to the zero clear state bit A1 of the page structure 1342A corresponding to the free page in the free page management list 1343, the zero clearing unit 133 searches for a free page not zero cleared.

When no free page not zero cleared is found ("NO" in step S1003) as a result of the search, the zero clearing unit 133 terminates the zero clearing process series. The zero clearing unit 133 waits for a new instruction to perform the zero clearing process from the process scheduler processing unit 131 (step S1004).

When a free page not zero cleared is found ("YES" in step S1003) as a result of the search, the zero clearing unit 133 selects one free page from among the found free pages. As described above with reference to FIG. 3, the free page management list 1343 is used to manage a free page for each different page size. Therefore, the free page selected by the zero clearing unit 133 may be a normal page, a large page obtained by combining normal pages, or a large page which is obtained by further combining large pages and of which a page size is larger than the large pages to be combined.

The zero clearing unit 133 attempts to lock the entire selected free page (step S1006). In particular, the zero clearing unit 133 attempts to set a lock flag indicating the exclusive execution of the zero clearing process on the zero clear state lock bit A2 of the page structure 1342A corresponding to the selected free page. By executing the process in step S1006, it may be suppressed to make the same free page be processed by the zero clearing unit 133 and the page allocating unit 132.

When the lock on the entire selected free page fails ("NO" in step S1007), the zero clearing unit 133 returns to the process in step S1002, and searches again for a free page which has not been zero cleared.

When the lock on the entire selected free page succeeds ("YES" in step S1007), the zero clearing unit 133 determines whether or not there is a request in waiting for an allocation of the selected free page (step S1008). In particular, the zero clearing unit 133 determines whether or not the page allocating unit 132 defines the selected free page as a page to be allocated, with reference to the zero clearing process control bit A3 of the page structure 1342A of the page structure 1342A corresponding to the selected free page. By periodically confirming the flag of the zero clearing process control bit A3 in the process in step S1008, control is performed to prioritize the allocating process by the page allocating unit 132 over the zero clearing process by the zero clearing unit 133, thereby preventing the process execution of the application program by the process execution unit 120, which has requested the page allocating unit 132 to allocate a memory, from stagnating due to the process by the zero clearing unit 133.

When there is a request in waiting for an allocation of the selected free page as a result of the determination, that is, When a zero clearing process suspension flag is set on the zero clearing process control bit A3 ("NO" in step S1008), then the zero clearing unit 133 releases the lock on the selected free page (step S1009). Then, the zero clearing unit 133 returns to the process in step S1002, and searches again for a free page which has not been zero cleared.

When there is no request in waiting for an allocation of the selected free page as a result of the determination, that is, When a zero clearing process suspension flag is not set on the zero clearing process control bit A3 ("YES" in step S1008), then the zero clearing unit 133 performs the process in step S1010. That is, the zero clearing unit 133 zero clears the memory region, within the physical memory 1341, corresponding to one normal page which has not been zero cleared in the selected page (step S1010).

The zero clearing unit 133 reflects the newly zero cleared state on the page structure 1342A corresponding to the selected page (step S1011). In particular, the zero clearing unit 133 sets a flag indicating the zero cleared state on the zero clear state bit A1 of the corresponding page structure 1342A. The zero clearing unit 133 adds a newly zero cleared region size to the zero clear state size A7 of the corresponding page structure 1342A.

For example, when the selected free page is a large page, the zero clearing unit 133 sets a flag indicating the zero cleared state for the page structure 1342A corresponding to the one leading normal page within the selected free page, and adds a zero cleared region size. Furthermore, the zero clearing unit 133 may set a flag indicating the zero cleared state for the page structure 1342A corresponding to the one newly zero cleared normal page, and add a zero cleared region size.

When the zero clearing process on a memory region corresponding to one normal page within the physical memory 1341 has been completed, the zero clearing unit 133 determines whether or not the zero clearing process on the entire selected page has been completed (step S1012). In particular, the zero clearing unit 133 determines whether or not the zero clear state size A7 of the page structure 1342A corresponding to one leading normal page within the selected free page matches the page size of the selected free page.

When it is determined that the zero clearing process on the entire selected page has not been completed ("NO" in step S1012), the zero clearing unit 133 returns to the process in step S1008, and determines whether or not there is a request in waiting for an allocation of the selected free page.

When the zero clearing process on the entire selected page has been completed ("YES" in step S1012), the zero clearing unit 133 releases the lock on the selected free page (step S1009). In particular, the zero clearing unit 133 sets a lock release flag indicating the stopping of the exclusive execution of the zero clearing process by the zero clearing unit 133 on the zero clear state lock bit A2 on which a lock flag is set in the process in step S1006. Then, the zero clearing unit 133 returns to the process in step S1002 and searches again for a free page which has not been zero cleared. Thus, the zero clearing process series is performed until there is no free page which has not been zero cleared in the free page management list 1343.

Thus, the zero clearing process of the memory which is to be requested in the allocating process of a memory region within the memory may be reduced by performing the above-mentioned zero clearing process series separately from the zero clearing process performed in the allocating process of the memory region within the memory. As a result, the initialized memory region of an appropriate region size corresponding to the requested process or task may be allocated at a high speed from the memory regions in the memory managed using a plurality of page sizes. In addition, by performing control so that the memory region allocating process may be prioritized over the above-mentioned zero clearing process series, the zero clearing process of the memory region corresponding to a free page may be performed without the delay in the allocating process of a memory region that is desired for performing a process or task.

Described next is the process performed by the page allocating unit 132. The process performed by the page allocating unit 132 may be roughly divided into a memory allocating process and a memory freeing up process.

Figure 6:
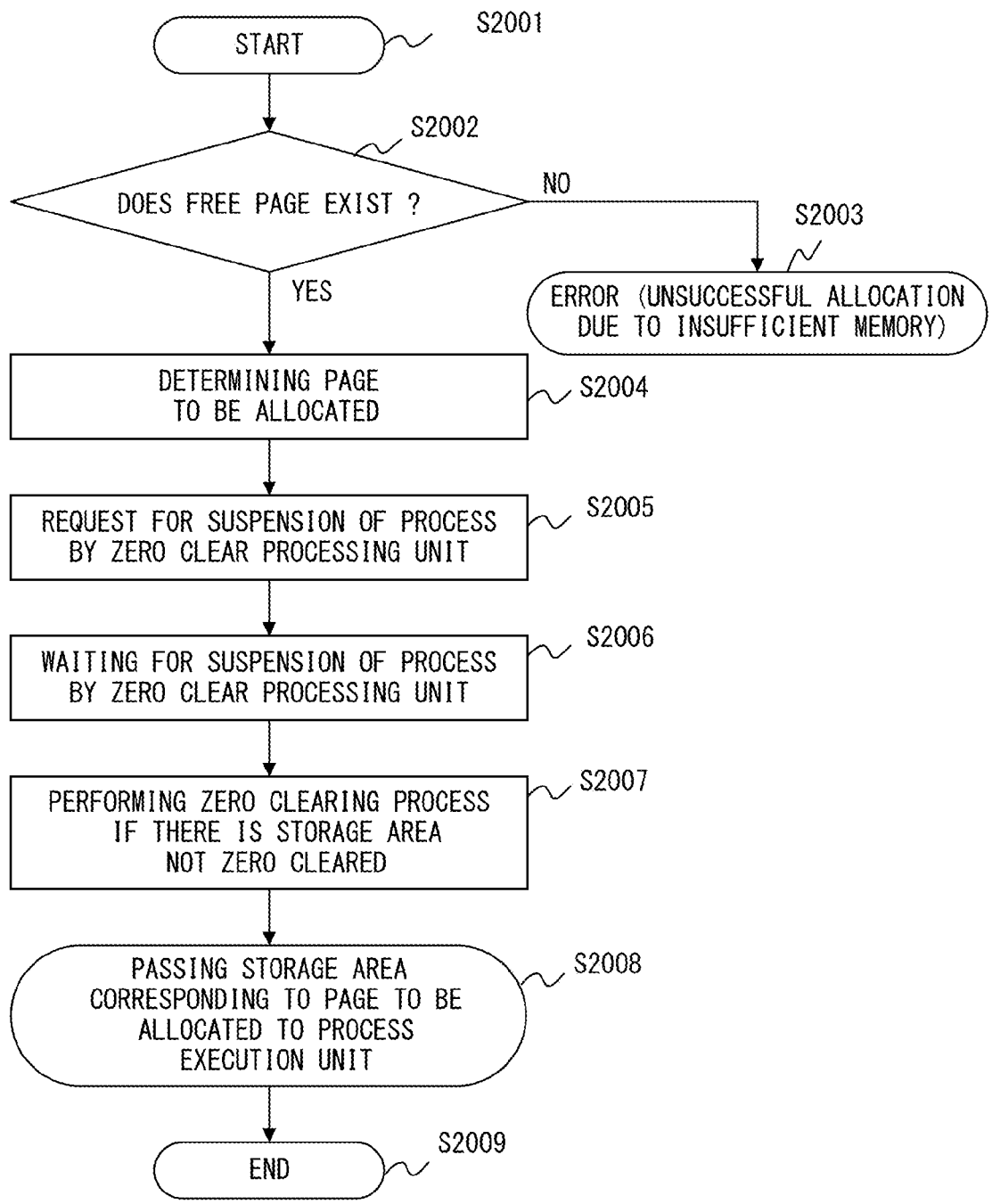
FIG. 6 is an exemplary flow diagram of a memory allocating process performed by a page allocating unit.

Described first is a memory allocating process performed by the page allocating unit 132. The memory allocating process is a process of allocating a memory region zero cleared in accordance with the region size or the page size of the memory requested from the process execution unit 120 from the memory regions within the memory managed using pages of a plurality of different page sizes. FIG. 6 is an exemplary flow diagram of a memory allocating process performed by a page allocating unit.

The page allocating unit 132 receives a request to allocate a memory region within the memory, which is desired for executing a process or task, from the process execution unit 120, and starts the memory allocating process series (step S2001). A configuration is made such that the request to allocate a memory region may be made by requesting the desired region size of memory, and by requesting a desired page size. The page allocating unit 132 searches for a free page having a page size equal to or larger than the region size of the memory requested from the process execution unit 120, or a free page having a page size equal to or larger than the page size requested from the process execution unit 120 with reference to the free page management list 1343 (step S2002).

When there is no free page of which size is equal to or larger than the region size or the page size requested from the process execution unit 120 ("NO" in step S2020), then the page allocating unit 132 determines that there is no unused memory region having the request region size, transmits a memory allocation error to the process execution unit 120, and terminates the memory allocating processes series (step S2003).

When there is a free page of which size is equal to or larger than the region size or page size requested from the process execution unit 120 ("YES" in step S2002), the page allocating unit 132 determines one free page in the detected free pages to be a page to be allocated. As described above with reference to FIG. 3, a free page is managed for each different page size in the free page management list 1343. Therefore, the free page determined by the page allocating unit 132 may be a normal page, a large page obtained by combining normal pages, or a large page which is obtained by further combining large pages and which is larger than the large page to be combined.

For example, the page allocating unit 132 selects a free page of the smallest size from among the free pages of which size is equal to or larger than the region size or page size requested from the process execution unit 120 from the free page management list 1343. If the page size of the selected free page is twice as large as or more than twice the region size or page size requested from the process execution unit 120, then the page allocating unit 132 divides the selected free page into two free pages except when the selected free page is a normal page. Then, the page allocating unit 132 selects one of the divided free pages as an allocation candidate page, and returns the other one of the divided free pages to the free page management list 1343 so that it may be managed as the size of the divided page. If the page size of the free page selected as an allocation candidate page is twice as large as or more than twice the region size or page size requested from the process execution unit 120, then the page allocating unit 132 re-divides the selected free page into two free pages. Then, the page allocating unit 132 selects one of the re-divided free pages as a new allocation candidate page, and returns the other one of the re-divided free page to the free page management list 1343 so that it maybe managed as the size of the re-divided page. Thus, until the size of the selected free page is less than twice the region size or page size requested from the process execution unit 120, the page allocating unit 132 repeats the above-mentioned dividing process. When the size of the selected free page becomes less than twice the region size requested by the process execution unit 120, the page allocating unit 132 determines the selected free page to be a page to be allocated.

Figure 7:
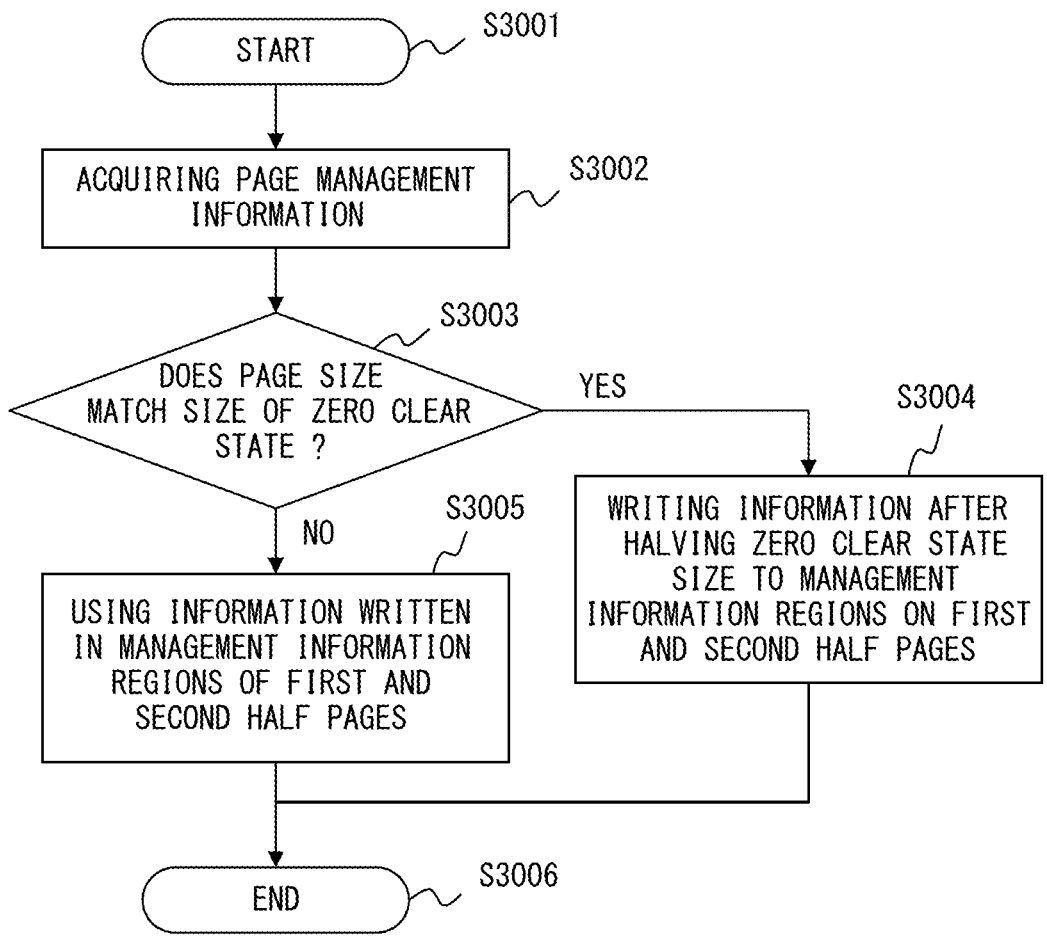
FIG. 7 is an exemplary flow diagram of an updating process of the management information related to a dividing process.

When the above-mentioned dividing process on a free page is performed, the page allocating unit 132 performs the updating process of management information about the divided free page such as the management information about the zero clear state, etc. FIG. 7 is an exemplary flow diagram of an updating process of the management information related to a dividing process.

When the page allocating unit 132 starts the updating process on the management information associated with the dividing process on a free page (step S3001), the page allocating unit 132 acquires the zero clear state size A7 of the page structure 1342A corresponding to the free page managed by the free page management list 1343 (step S3002). For example, when a free page to be processed is a large page, the page allocating unit 132 acquires the zero clear state size A7 of the page structure 1342A corresponding to one leading normal page in the large page.

The page allocating unit 132 compares the zero cleared region size indicated by the acquired zero clear state size A7 with the page size of the free page managed by the free page management list 1343 (step S3003).

When the both sizes match each other as a result of the comparison ("YES" in step S3003), the page allocating unit 132 halves the zero cleared region size indicated by the acquired zero clear state size A7. Then, the page allocating unit 132 writes the halved region size to the zero clear state size A7 of each page structure 1342A corresponding to the two free pages obtained by dividing the free page by the dividing process (step S3004).

When the both sizes do not match each other as a result of the comparison ("NO" in step S3003), the page allocating unit 132 holds the zero clear state size A7 as the management information about each of the two divided free pages without rewriting the zero clear state size A7 already recorded in each page structure 1342A corresponding to each of the two divided free pages (step S3005).

When the process in step S3004 or the process in step S3005 is performed, the page allocating unit 132 terminates the management information updating process series (step S3006). When the large page selected as an allocation candidate page is re-divided, the page allocating unit 132 again performs the updating process series on the management information.

For comprehensibility of the processes in steps S3004 and S3005, the updating process of the management information related to the dividing process is explained below with reference to FIGS. 8 and 9.

FIG. 8 is a first explanatory view of an updating process of the management information related to a dividing process. FIG. 8 exemplifies the case in which a large page A of 16 Kbytes size is divided into two 8-Kbyte normal pages B and C.

In an example illustrated in FIG. 8, the memory region corresponding to the large page A within the memory is all zero cleared, and "zero clear state =zero cleared for 16 Kbytes" is recorded in the management information region of the large page A. In particular, in the management information region of the large page A, the information "zero clear state =zero cleared" is recorded in the zero clear state bit A1 of the page structure 1342A corresponding to one leading normal page in the large page A, that is, one first-half normal page in the large page A. The information "zero clear state =16 Kbytes" is recorded in the zero clear state size A7 of the page structure 1342A corresponding to one first-half normal page in the large page A. Thus, the management information about the large page A is recorded in the page structure 1342A corresponding to one first-half normal page in the large page A. In this manner, in the method of recording the management information about a page according to the embodiment, the management information about a large page may be searched or updated without reference to the entire page structure for each normal page in the large page, thereby simplifying and speeding up the processes of searching and updating the management information. Furthermore, independent of the page size, the process of dividing a page accompanied by the update of the management information may be performed.

Relating to the large page A illustrated in FIG. 8, the page size (16 Kbytes) of the large page A matches the zero cleared region size (16 Kbytes) of the large page A. Then, in the case where the large page A is divided into two, that is, normal pages B and C, the region size in the zero cleared state recorded in the management information region of the large page A, that is, 16 Kbytes, is halved. Then, as illustrated in FIG. 8, the information "zero clear state=zero cleared for 8 Kbytes" after performing the halving process is recorded as the management information about the divided normal pages B and C in the respective management information regions.

In particular, the information "zero clear state=zero cleared" is recorded in the zero clear state bit A1 of each page structure 1342A corresponding to the normal pages B and C. Furthermore, the information "zero clear state =8 Kbytes" is recorded in the zero clear state size A7 of each page structure 1342A corresponding to the normal pages B and C.

Figure 9:
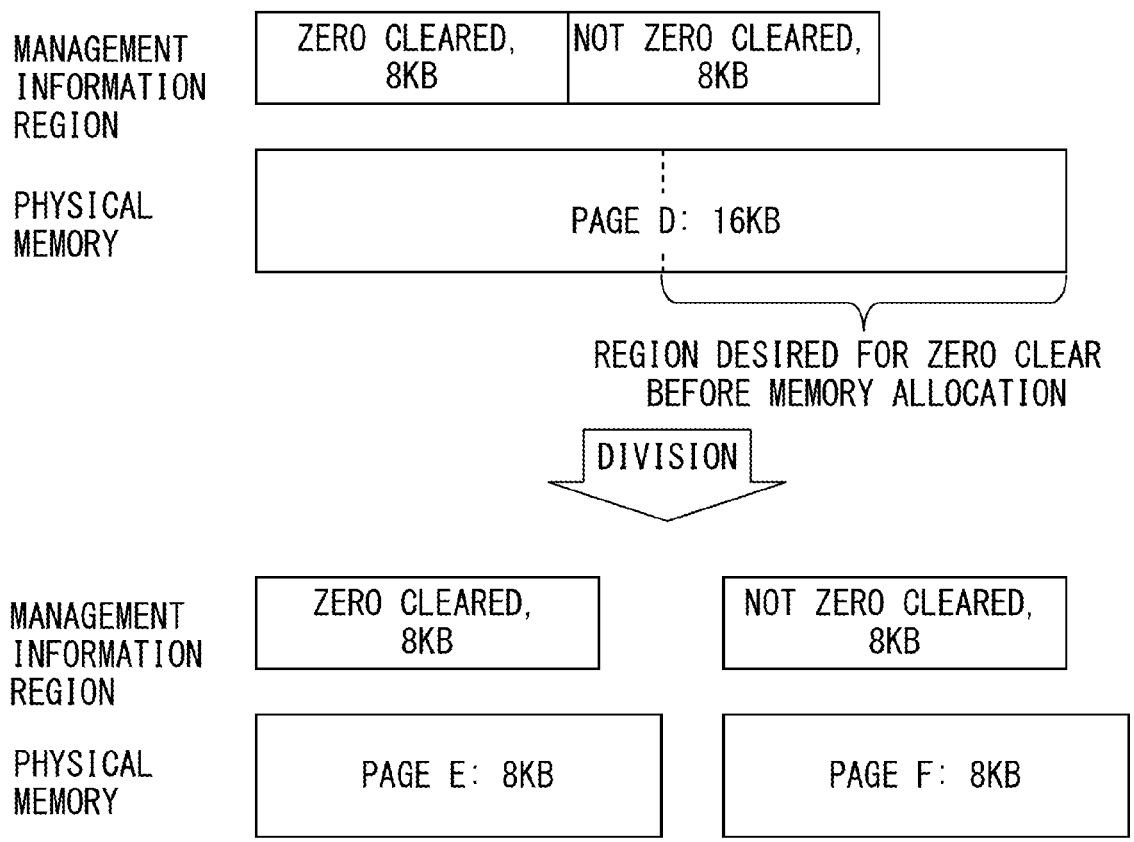
FIG. 9 is a second explanatory view of an updating process of the management information related to a dividing process.

FIG. 9 is a second explanatory view of an updating process of the management information related to a dividing process. FIG. 9 illustrates the case where the large page D having a page size of 16 Kbytes is divided into two, that is, normal pages E and F.

In the example illustrated in FIG. 9, the memory region of one first-half normal page of the large page D has been zero cleared, and the memory region of one second-half normal page has not been zero cleared. Then, in the management information region of the large page D, "zero clear state=zero cleared for 8 Kbytes" is recorded for one first-half normal page, and "zero clear state=not zero cleared for 8 Kbytes" is recorded for one second-half normal page. In particular, the information "zero clear state=zero cleared for 8 Kbytes" is recorded in the zero clear state bit A1 and the zero clear state size A7 of the page structure 1342A corresponding to the first-half normal page in the large page D. The information "zero clear state=not zero cleared for 8 Kbytes" is recorded in the zero clear state bit A1 and the zero clear state size A7 of the page structure 1342A corresponding to the second-half normal page in the large page D. Thus, the management information about the large page D is divided so as to be recorded and managed in first- and second-half normal pages.

In the large page D illustrated in FIG. 9, the page size (16 Kbytes) of the large page D does not match the zero cleared region size (8 Kbytes) of the large page D. Then, in the process in step S3005 in FIG. 7, the information "zero clear state=zero cleared for 8 Kbytes" for the one first-half normal page in the management information of the large page D is continuously held as the management information about the normal page E corresponding to one first-half normal page of the large page D. In the management information about the large page D, the information "zero clear state=not zero cleared for 8 Kbytes" for one second-half normal page is continuously held as the management information about the normal page F corresponding to the second-half normal page of the large page D. In particular, the information "zero clear state=zero cleared for 8 Kbytes" is continuously held by the zero clear state bit A1 and the zero clear state size A7 of the page structure 1342A corresponding to the normal page E. Furthermore, the information "zero clear state=not zero cleared for 8 Kbytes" is continuously held by the zero clear state bit A1 and the zero clear state size A7 of the page structure 1342A corresponding to the normal page F.

In the process in step S2004 in FIG. 6 including the above-mentioned page dividing process and the management information updating process, a free page to be allocated is determined. The page allocating unit 132 requests the zero clearing unit 133 to suspend the zero clearing process on the determined free page to be allocated (step S2005). In particular, the page allocating unit 132 sets a zero clearing process suspension flag on the zero clearing process control bit A3 of the page structure 1342A corresponding to the free page to be allocated. In the process in step S2005, control is performed so that the allocating process by the page allocating unit 132 can be prioritized over the zero clearing process by the zero clearing unit 133 even though the memory region corresponding to the free page to be allocated is in the zero clear process of the zero clearing unit 133. Therefore, the execution of the process of the application program by the process execution unit 120 which requests the page allocating unit 132 to allocate the memory region in the memory may be prevented from becoming stalled by the process of the zero clearing unit 133.

The page allocating unit 132 waits for the suspension of the zero clearing process being performed by the zero clearing unit 133 on the free page to be allocated (step S2006). In particular, the page allocating unit 132 refers to the zero clear state lock bit A2 of the page structure 1342A corresponding to the free page to be allocated. If a lock flag is set on the referenced zero clear state lock bit A2, the page allocating unit 132 waits for the zero clear state lock bit A2 to change from the lock flag to the lock release flag. The lock flag refers to a flag indicating the exclusive execution of the zero clearing process by the zero clearing unit 133. The lock release flag refers to the flag indicating the suspension of the exclusive execution of the zero clearing process by the zero clearing unit 133.

When the zero clearing process by the zero clearing unit 133 on the free page to be allocated is suspended, the page allocating unit 132 reads the zero clear state bit A1 and the zero clear state size A7 of the page structure 1342A corresponding to the free page to be allocated. Then, the page allocating unit 132 searches, using the read zero clear state bit A1 and zero clear state size A7, the free pages to be allocated for a memory region on which the zero clearing process has not been performed. In particular, the page allocating unit 132 determines whether or not a flag indicating the zero cleared state is set on the read zero clear state bit A1. The page allocating unit 132 also determines whether or not the page size of the free page to be allocated matches the read zero clear state size A7. When the flag indicating the zero cleared state is not set on the zero clear state bit A1, and when the page size of the free page to be allocated does not match the read zero clear state size A7, the page allocating unit 132 determines that there is a memory region in which the zero clearing process has not been performed. Then, the page allocating unit 132 zero clears the memory region in which the zero clearing process has not been performed (step S2007).

When all memory regions corresponding to the free page to be allocated are zero cleared, the page allocating unit 132 passes the zero cleared memory region corresponding to the free page to be allocated to the process execution unit 120 which has requested the allocation (step S2008). Then, the page allocating unit 132 terminates the memory allocating process series (step S2009).

Described next is the memory freeing up process executed by the page allocating unit 132. The memory freeing up process is a process of freeing up the memory region within the memory, which is freed up after the execution of the process or task by the process execution unit 120, as a memory region corresponding to a free page of a specified page size in a plurality of different page sizes targeted for management.

When the memory region within the memory, which has been allocated to the execution of the process or task by the process execution unit 120, is freed up, the page allocating unit 132 starts the memory freeing up process. The page allocating unit 132 marks the page corresponding to the freed up memory region as a free page which has not been zero cleared. In particular, the page allocating unit 132 sets on the zero clear state bit A1 of the page structure 1342A corresponding to the freed up free page a flag indicating that the zero clearing process has not been performed. The page allocating unit 132 sets a flag indicating a free page on the free page bit A4. The page allocating unit 132 writes "0", which is a value indicating that there is no zero cleared region size, on the zero clear state size A7.

The page allocating unit 132 stores in the free page management list 1343 the page marked as a free page which has not been zero cleared. In particular, the page allocating unit 132 performs the following process.

As described above with reference to FIG. 3 etc., in the information processing apparatus according to the embodiment, including the application execution computer 11 as an example, the memory regions in the memory are managed using pages having a plurality of different page sizes. Then, a buddy of a free page to be stored may exist in the free page management list 1343. A buddy refers to a page to be combined with the current page so as to make a page of which a page size is larger than the current page. In the buddy system, a buddy to be a combination partner of the current page is determined in advance according to a specified combination rule. The page allocating unit 132 refers to an entry corresponding to the page size of a free page to be stored, and confirms whether or not there is a buddy of the free page to be stored in the free page management list 1343.

When there is no buddy of the free page to be stored as a result of the confirmation, the page allocating unit 132 writes a specified value to the pointers A5 and A6 of the page structure 1342A corresponding to the free page to be stored, and stores the free page to be stored in the free page management list 1343. When there is a buddy of the free page to be stored as a result of the confirmation, the page allocating unit 132 performs a process of combining the free page to be stored with the buddy of the free page to be stored.

The page allocating unit 132 confirms whether or not there is a buddy of the combined page in the free page management list 1343. When there is no buddy of the combined page as a result of the confirmation, the page allocating unit 132 writes a specified value to the pointers A5 and A6 of the page structure 1342A corresponding to the combined page, and stores the combined page in the free page management list 1343. When there is a buddy of the combined page as a result of the confirmation, the page allocating unit 132 performs the process of combining the combined page with the buddy of the combined page. Then, the page allocating unit 132 repeats the above-mentioned combining process until it is confirmed that there is no buddy in the free page management list 1343.

When the above-mentioned combining process is performed, the page allocating unit 132 reflects the management information about the two combined pages in the management information about the combined page so as not to lose the management information about the two combined page. FIG. 10 is an exemplary flow diagram of an updating process of the management information related to a combining process.

When the updating process of the management information related to the free page combining process is started (step S4001), the page allocating unit 132 acquires the management information about the first-half free page to be combined (first free page) (S4002). The page allocating unit 132 also acquires the management information about the second-half free page to be combined (second free page) (S4002). In the first and second-half free pages, one free page corresponds to a newly freed up memory region, or a combined page obtained by combining the page corresponding to the newly freed up memory region with the buddy in the free page management list 1343. Another free page is a buddy of the first-half free page, and exists in the free page management list 1343. The management information acquired by the processes in steps S4002 and S4003 is the zero clear state bit A1 and the zero clear state size A7 of each page structure 1342A corresponding to the first- and second-half free pages.

The page allocating unit 132 determines on the basis of the acquired management information whether or not the zero clear state of the first-half free page matches the zero clear state of the second-half free page (step S4004). In particular, the page allocating unit 132 determines whether or not the zero clear state bit A1 of the first-half free page matches the zero clear state bit A1 of the second-half free page, the page size of the first-half free page matches the zero clear state size A7 of the first-half free page, and the page size of the second-half free page matches the zero clear state size A7 of the second-half free page.

When it is determined that the zero clear state of the first-half free page matches the zero clear state of the second-half free page ("YES" in step S4004), the page allocating unit 132 collectively describes the management information about the first- and second-half free pages as the management information about the combined page (step S4005). In particular, the page allocating unit 132 holds the zero clear state bit A1 of the page structure 1342A corresponding to the first-half free page as the information as to whether or not the combined page has been zero cleared. Furthermore, the page allocating unit 132 writes a total value of the zero clear state size A7 of the first- and second-half free pages to the zero clear state size A7 of the page structure 1342A corresponding to the first-half free page.

When it is determined that the zero clear state of the first-half free page does not match the zero clear state of the second-half free page ("NO" in step S4004), the page allocating unit 132 holds the management information about the first- and second-half free pages as the management information about the combined page (step S4006). In particular, the page allocating unit 132 holds the zero clear state bit A1 of each of page structures 1342A corresponding to the first- and second-half free pages as the information as to whether or not the combined page has been zero cleared. Furthermore, the page allocating unit 132 holds the zero clear state size A7 of each of page structures 1342A corresponding to the first- and second-half free pages as the information about the zero cleared region size of the combined page.

When the process in step S4005 or the process in step 54006 is executed, the page allocating unit 132 terminates the updating process series on the management information (step S4007). When the combined page and the buddy of the combined page are further combined, the page allocating unit 132 performs again the updating process series on the management information.

For comprehensibility of the process in step S4005 and the process in step S4006, the process of updating the management information related to the combining process is described below with reference to FIGS. 11 through 13.

FIG. 11 is a first explanatory view of an updating process of the management information related to a combining process. FIG. 11 exemplifies the case where two 8-Kbyte normal pages G and H are combined into a large page I of which a page size is 16 Kbytes.

In an example illustrated in FIG. 11, the memory region corresponding to the normal pages G and H within the memory is all zero cleared, and "clear state=zero cleared for 8 Kbytes" is recorded in each management information region of the normal pages G and H. In particular, in each management information region of the normal pages G and H, the information "zero clear state=zero cleared" is recorded in the zero clear state bit A1 of each of the page structures 1342A corresponding to the normal pages G and H. Furthermore, the information "zero clear state=8 Kbytes" is recorded in the zero clear state size A7 of each of the page structures 1342A corresponding to the normal pages G and H.

In the normal pages G and H illustrated in FIG. 11, the zero clear state bit A1 of the normal page G matches the zero clear state bit A1 of the normal page H. Furthermore, the page size of the normal page G matches the zero clear state size A7 of the normal page G. The page size of the normal page H matches the zero clear state size A7 of the normal page H. Then, in the case where the normal pages G and H are combined into a large page I, the information about the zero cleared state recorded in the management information region of the normal page G in the process in step S4005 in FIG. 10 is held in the management information region of the large page I. In addition, the total value of the zero cleared region size of the normal pages G and H is held in the management information region of the large page I. In particular, the information "zero clear state=zero cleared" of the large page I is recorded in the zero clear state bit A1 of the page structure 1342A corresponding to one first-half normal page of the large page I. Furthermore, the information "zero clear state=16 Kbytes" of the large page I is recorded in the zero clear state size A7 of the page structure 1342A corresponding to one first-half normal page of the large page I.

Thus, the management information about the large page may not be recorded in all page structures for each normal page in the large page. In addition, the management information about the large page may be acquired without reference to all page structures of each normal page in the large page. Therefore, in the updating process of the management information relating to the a page according to the embodiment, the searching and updating processes of the management information about a page may be simplified and performed at a high speed.

Figure 12:
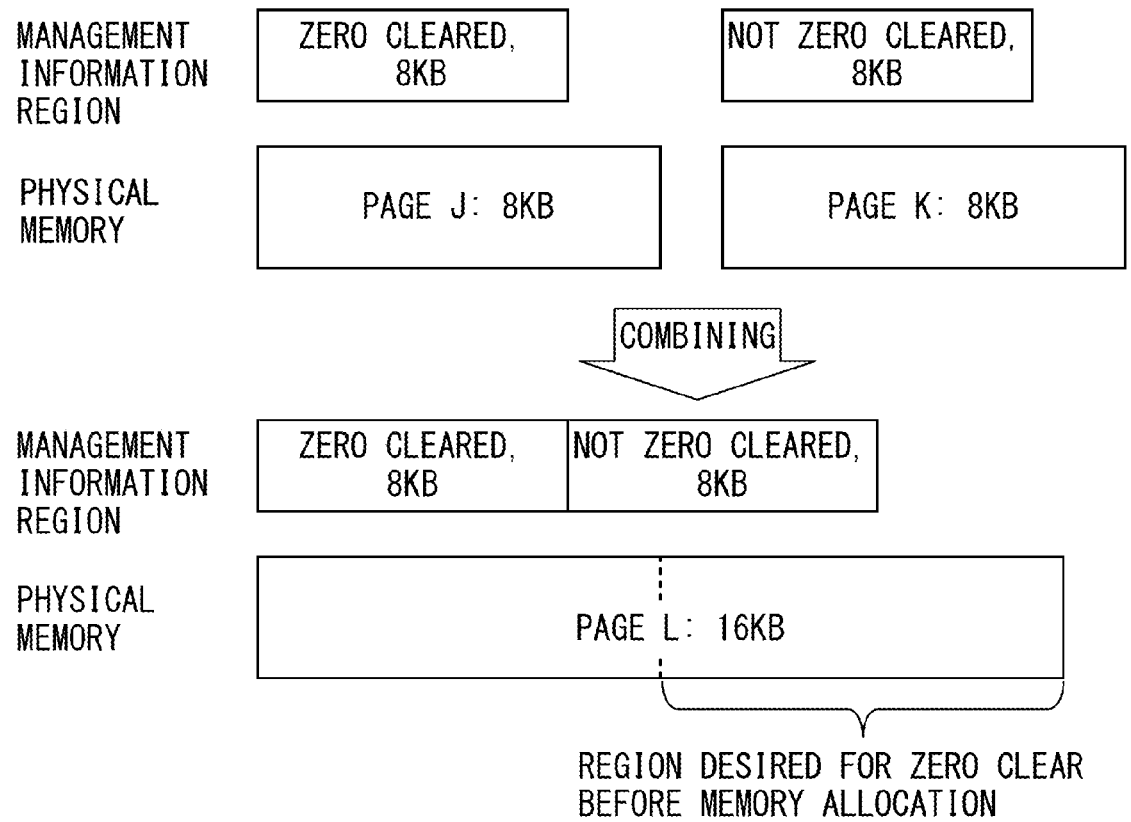
FIG. 12 is a second explanatory view of an updating process of the management information related to a combining process.

FIG. 12 is a second explanatory view of an updating process of the management information related to a combining process. FIG. 12 exemplifies the case where two 8-Kbyte normal pages J and K are combined into the large page L of which a page size is 16 Kbytes.

In the example illustrated in FIG. 12, the memory region corresponding to the normal page J within the memory has been zero cleared, and the memory region corresponding to the normal page K within the memory has not been zero cleared. Then, in the management information region of the normal page J, "zero clear state=zero cleared for 8 Kbytes" is recorded, and in the management information region of the normal page K, "zero clear state=not zero cleared for 8 Kbytes" is recorded. In particular, the information "zero clear state=zero cleared for 8 Kbytes" of the normal page J is recorded in the zero clear state bit A1 and the zero clear state size A7 of the page structure 1342A corresponding to the normal page J. The information "zero clear state=not zero cleared for 8 Kbytes" of the normal page K is recorded in the zero clear state bit A1 and the zero clear state size A7 of the page structure 1342A corresponding to the normal page K.

In the two normal pages J and K illustrated in FIG. 12, the zero clear state bit A1 of the normal page J does not match the zero clear state bit A1 of the normal page K. Furthermore, the page size of the normal page K does not match the zero clear state size A7 of the normal page K. Then, in the process in step S4006 in FIG. 10, the information "zero clear state=zero cleared for 8 Kbytes" of the normal page J is continuously held in the management information region of the combined large page L. In addition, the information "zero clear state=not zero cleared for 8 Kbytes" of the normal page K is continuously held in the management information region of the combined large page L. In particular, the information "zero clear state=zero cleared for 8 Kbytes" of the normal page J is continuously held by the zero clear state bit A1 and the zero clear state size A7 of the page structure 1342A corresponding to one first-half normal page of the large page L. Furthermore, the information "zero clear state=not zero cleared for 8 Kbytes" of the normal page K is continuously held by the zero clear state bit A1 and the zero clear state size A7 of the page structure 1342A corresponding to one second-half normal page of the large page L.

Figure 13:
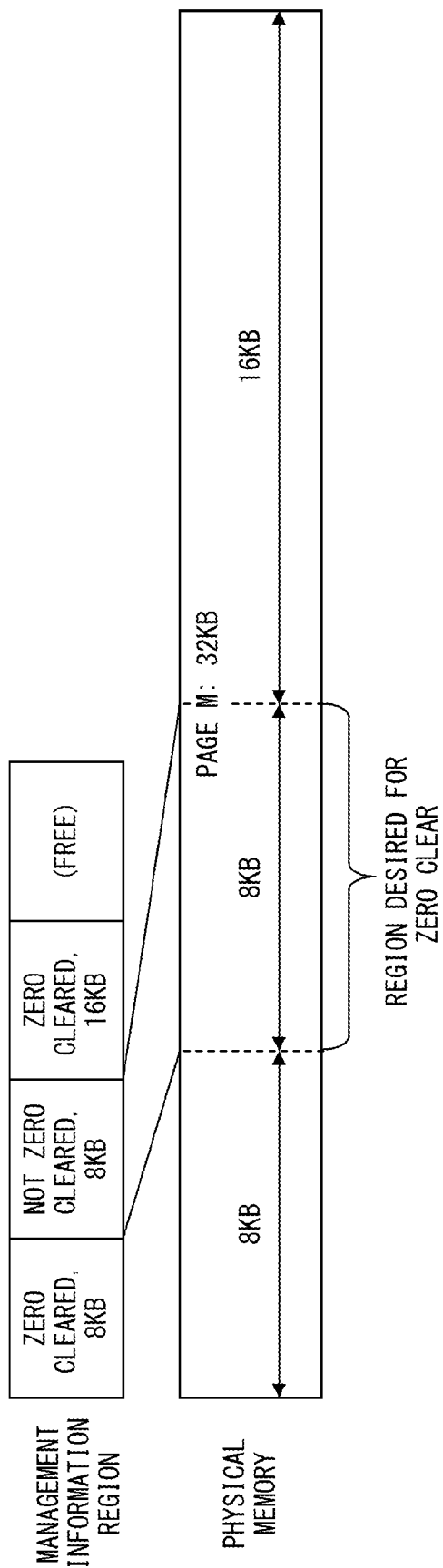
FIG. 13 is a third explanatory view of an updating process of the management information related to a combining process.

FIG. 13 is a third explanatory view of an updating process of the management information related to a combining process. FIG. 13 exemplifies a large page M obtained by combining the large page L illustrated in FIG. 12 with the large page I illustrated in FIG. 11.

As illustrated in FIG. 12, in the management information region of the large page L, "zero clear state=zero cleared for 8 Kbytes" is recorded as the management information about one first-half normal page. In addition, in the management information region of the large page L, "zero clear state=zero cleared for 8 Kbytes" is recorded as the management information about one second-half normal page. As illustrated in FIG. 11, in the management information region of the large page I, "zero clear state=zero cleared for 16 Kbytes" is recorded. Therefore, the zero clear state of the large page L does not match the zero clear state of the large page I. That is, the zero clear state bit A1 of the large page L does not match the zero clear state bit A1 of the large page I. Furthermore, the page size of the large page L does not match the zero clear state size A7 of the large page L. Then, as illustrated in FIG. 13, the management information region of the large page M continuously holds the information about the zero clear state of the large pages L and I.

Thus, in the case where large pages are combined, the management information about the combined large pages may not be recorded in all page structures for each normal page in the combined large page. In addition, the management information about the combined large page may be acquired without reference to all page structures for each normal page in the combined large page. Therefore, according to the process of updating the management information about a page according to the embodiment, the searching and updating process on the management information about a page may be simplified and performed at a high speed. Furthermore, the combining process of pages accompanied by the update of management information may be performed without dependence on the page size.

As is understood from the explanation above, the information processing apparatus according to the embodiment in which the application execution computer 11 is used as an example manages the initialization state of the memory region corresponding to each page within the memory using the management information about each page having different page sizes. Then, the information processing apparatus according to the embodiment performs the initializing process on an uninitialized region indicated by the management information in the memory region corresponding to the free page. Therefore, as compared with the case where all memory regions corresponding to the page to be allocated are constantly initialized, the region size required to perform the initializing process in allocating the memory region may be reduced, thereby shortening the processing time of the entire allocating process accompanied by the initializing process. That is, the process of allocating an initialized memory region in accordance with the size specified by a memory requester may be performed at a high speed.

Furthermore, the information processing apparatus according to the embodiment may perform the initializing process on the memory region corresponding to a free page within the memory separately from the allocating process of the memory region in the memory. Therefore, since the region size desired for the initializing process in allocating a memory region may be reduced, the processing time of the entire allocating process accompanied by the initializing process may be reduced. That is, the process of allocating the initialized memory region in accordance with the size specified by a memory acquisition requester may be performed at a higher speed.

Various types of processes performed by the information processing apparatus according to the above-mentioned embodiment including the allocating process of memory and the initializing process of memory are illustrative only, and may be modified as appropriate. For example, in the description above, the combining process of pages is an example performed in the memory freeing up process, and may be modified so that the combining process of pages is performed during the memory allocating process.

As described above, in the information processing apparatus according to the embodiment, the execution of the memory allocating process is given priority over the execution of the memory initializing process which is performed asynchronously with the memory allocating process to suppress the delay of a job for which a memory allocation is requested. Furthermore, in the information processing apparatus according to the embodiment, the asynchronous zero clearing process may be controlled to suppress the influence on the performance of a job.

The timing with which the process scheduler processing unit 131 allows the zero clearing unit 133 to perform the zero clearing process in cooperation with the job scheduler processing unit 12A and the job management unit 110 may be the following two timings, that is, there is a first timing at which all jobs of the application program specified via a job scheduling system such as the job scheduler processing unit 12A and the job management unit 110 are completed in the application execution computer 11. In addition, there is a second timing at which the initializing process is performed concurrently with the job of the application program specified via the scheduling system in the application execution computer 11. Using an example of the application execution computer 31 illustrated in FIG. 4, a method of controlling the zero clearing process with the first and second timings is described below.

Figure 14:
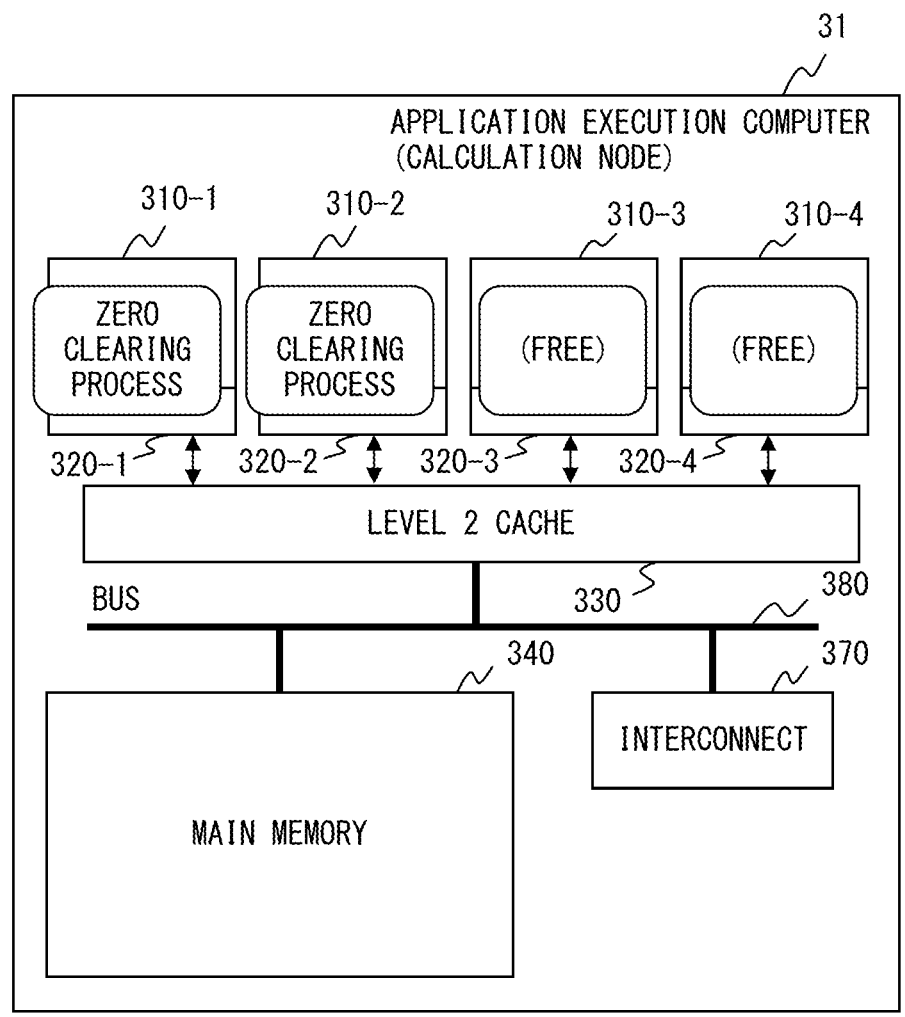
FIG. 14 is an explanatory view of a zero clearing process with a first timing.

The first timing is described first. FIG. 14 is an explanatory view of a zero clearing process with the first timing. For clarity of explanation, a portion of the components of the application execution computer 31 illustrated in FIG. 4 are omitted.

With the first timing at which all jobs of the application program specified via the job scheduling system are completed, there is no job prioritized over the zero clearing process in the application execution computer 31.

Then, with the first timing, the processor resources in the application execution computer 31 are used for performing the zero clearing process so that the zero clearing process on the main memory 340 may be completed within a short time. For example, as illustrated in FIG. 14, the zero clearing process on the main memory 340 is completed within a short time by allowing two CPU cores 310 from among the four CPU cores 310 to perform the zero clearing process. With the first timing, the CPU core 310 which perform the zero clearing process may exclusively use the level 2 cache 330 and a memory bus in the bus 380.

The second timing is described next. FIG. 15 is an explanatory view of a zero clearing process with the second timing. FIG. 15 illustrates an example of allowing one CPU core 310 to which no job is allocated to perform the zero clearing process when a job is allocated to three CPU cores 310 in the four CPU cores 310 included in the application execution computer 31. For clarity of explanation, a portion of the components of the application execution computer 31 illustrated in FIG. 4 are omitted.

With the second timing at which the zero clearing process is performed concurrently with the execution of the job of the specified application program, the level 2 cache 330 and the memory bus in the bus 380 is shared by the CPU core 310 which performs the job and the CPU core 310 which performs the zero clearing process. Since the band of the level 2 cache 330 and the memory bus is limited, the memory access performance of a job is degraded if the band of the level 2 cache 330 and the memory bus is allocated to the execution of the zero clearing process, and a performance delay in the job may occur. Thus, with the second timing, control is performed so that the zero clearing process is performed using at least one of the two methods described below.

First, in the first control method, with the store instruction in the zero clearing process, the CPU core 310 which performs the zero clearing process uses an instruction to suppress the use of a cache. In particular, the CPU core 310 which performs the zero clearing process accesses the main memory 340 using the CPU instruction which is capable of directly accessing to the memory bus by bypassing the level 2 cache 330. In the first control method, since the level 2 cache 330 is not shared between the CPU core 310 which performs a job and the CPU core 310 which performs the zero clearing process, the influence on the performance of a job may be reduced.

In the second control method, the interconnect 370 is implemented with the Remote Direct Memory Access (RDMA) function. In addition, a zero cleared memory region is set in advance in the main memory 340 of any calculation node 31 in a plurality of calculation nodes (application execution computers) 31 included in the computer system 3. Then, the calculation node 31 which performs the zero clearing process RDMA-transfers the zero cleared memory region in any calculation node 31 on the main memory 340 in the calculation node 31 via the interconnect 370, thereby performing the zero clearing process of a specified region in the main memory 340. When the interconnect 370 is connected to the memory bus as illustrated in FIG. 15, the interconnect 370 may directly access the main memory 340 without the level 2 cache 330. Therefore, in the second control method, since the zero clearing process may be performed without any conflict for the level 2 cache 330 between the CPU core 310 which performs a job and the CPU core 310 which performs the zero clearing process, the influence on the performance of the job may be reduced.

As described above, the components for performing the various above-mentioned processes according to the embodiment including the page allocating unit 132 and the zero clearing unit 133 may be realized by hardware components including the CPU core 310, the level 1 cache 320, and the level 2 cache 330. Furthermore, the components for performing various above-mentioned processes according to the embodiment may also be realized by a computer which executes a control program which regulates the various above-mentioned process procedures including the memory allocating process and the memory initializing process according to the embodiment. For example, the control program which regulates the various above-mentioned process procedures is stored in a recording medium such as a magnetic disk, an optical disk, a magneto optical disk, etc. The control program stored in the recording medium is stored in the storage 350 via the storage medium drive 360. Then, the processor including the CPU core 310, the level 1 cache 320, and the level 2 cache 330 reads the control program stored in the storage 350 into the main memory 340, and executes the control program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a free page storage unit which divides a memory region in a memory into pages of a plurality of different page sizes and manages the divided pages, and stores management information about an initialization state corresponding to an unused memory region in the memory; and
a page allocating unit which selects a free page of a page size according to a requested region size or a requested page size from the free page storage unit when an allocation of the unused memory region is requested, and performs an initializing process on a memory region on which the initializing process has not been performed in a memory region corresponding to the free page using management information about the selected free page, wherein:
the free page storage unit includes a page structure set in page units having a smallest page size in the plurality of different page sizes;
when first and second pages having the smallest page size are free pages on which the initializing process has been performed, the page allocating unit records management information about a third page obtained by combining the first and second pages in the page structure corresponding to the first page; and
when any of the first and second pages is a free page on which the initializing process has not been performed, the page allocating unit records the management information about the third page in each of the page structures corresponding to the first and second page.

2. The information processing apparatus according to claim 1, wherein:
when a page size of a fourth page matches an initialized region size indicated by the management information about the fourth page, the page allocating unit records a size obtained by halving the initialized region size in the page structures corresponding to each of fifth and sixth pages obtained by dividing the fourth page; and
when the page size of the fourth page does not match the initialized region size, the page allocating unit records information about the page structure corresponding to a first-half page in the fourth page as information about the page structure corresponding to the fifth page, and stores information about the page structure corresponding to a second-half page in the fourth page as information about the page structure corresponding to the sixth page.

3. The information processing apparatus according to claim 1 further comprising a zero clearing unit which performs an asynchronous initializing process on a memory region corresponding to the free page stored in the free page storage unit using the management information about the free page with a timing different from a timing of allocating process of a memory region, the allocating process including the initializing process performed by the page allocating unit.

4. The information processing apparatus according to claim 3, wherein the zero clearing unit determines whether or not the free page selected from the free page storage unit is a page to be allocated by the page allocating unit, and suspends the asynchronous initializing process on the free page when the selected free page is a page to be allocated by the page allocating unit.

5. The information processing apparatus according to claim 3, wherein
the management information about the free page includes a control flag for control of execution of the asynchronous initializing process performed by the zero clearing unit on the free page, and
when it is determined that the free page is a page to be processed in the allocating process, the page allocating unit sets a suspension flag for suspending the asynchronous initializing process performed by the zero clearing unit on the control flag.

6. The information processing apparatus according to claim 5, wherein the zero clearing unit confirms whether or not the suspension flag has been set on the control flag after the initializing process on one normal page in the free page is performed.

7. The information processing apparatus according to claim 3, further comprising:
a process scheduler processing unit which controls a timing at which the zero clearing unit performs the asynchronous initializing process; wherein
the process scheduler processing unit allows the zero clearing unit to perform the asynchronous initializing process with a first timing with which a job performed using an initialized memory region allocated by the page allocating unit has been completed.

8. The information processing apparatus according to claim 7, wherein with a second timing during a job performed using a memory region allocated by the page allocating unit, the process scheduler processing unit allows the zero clearing unit to perform the asynchronous initializing process without using a cache shared with a process execution unit which performs the job or a memory bus between the zero clearing unit and the memory.

9. A control method executed by an information processing apparatus, the control method comprising:
storing, in a free page storage unit which divides a memory region in a memory into pages of a plurality of different page sizes and manages the divided pages, management information about an initialization state corresponding to an unused memory region in the memory;
selecting a free page of a page size according to a requested region size or a requested page size from the free page storage unit when an allocation of the unused memory region is requested; and
performing an initializing process on a memory region on which the initializing process has not been performed in a memory region corresponding to the free page using management information about the selected free page, wherein
the free page storage unit includes a page structure set in page units having a smallest page size from among the plurality of different page sizes, and
the control method further comprising:
recording management information about a third page obtained by combining first and second pages in the page structure corresponding to the first page when the first and second pages having the smallest page size are free pages on which the initializing process has been performed; and
recording the management information about the third page in each of the page structures corresponding to the first and second page when any of the first and second pages is a free page on which the initializing process has not been performed.

10. The control method according to claim 9 further comprising:
recording a size obtained by halving an initialized region size in each of the page structures corresponding to fifth and sixth pages obtained by dividing a fourth page when a page size of the fourth page matches the initialized region size indicated by the management information about the fourth page; and
storing information about the page structure corresponding to a first-half page in the fourth page as information about the page structure corresponding to the fifth page when the page size of the fourth page does not match the initialized region size, and storing information about the page structure corresponding to a second-half page in the fourth page as information about the page structure corresponding to the sixth page.

11. The control method according to claim 9 further comprising performing an asynchronous initializing process on a memory region corresponding to the free page stored in the free page storage unit using the management information about the free page with a timing different from a timing of allocating process of a memory region, the allocating process including the initializing process.

12. The control method according to claim 11 further comprising:
determining whether or not the free page selected from the free page storage unit is a page to be processed in the allocating process; and
suspending the asynchronous initializing process on the free page when the free page is a page to be allocated in the page allocating process.

13. The control method according to claim 11, wherein
the management information about the free page includes a control flag for control of execution of the asynchronous initializing process on the free page, and
the control method further comprising
setting a suspension flag for suspending the asynchronous initializing process on the control flag when it is determined that the free page is a page to be processed in the allocating process.

14. The control method according to claim 13 further comprising confirming whether or not the suspension flag has been set on the control flag after the asynchronous initializing process on one normal page in the free page is performed.

15. The control method according to claim 11 further comprising:
controlling a timing at which the asynchronous initializing process is performed; and
performing the asynchronous initializing process with a first timing with which a job performed using an initialized memory region allocated by the allocating process has been completed.

16. The control method according to claim 15 further comprising performing the asynchronous initializing process with a second timing during a job performed using a memory region allocated by the allocating process without using a cache shared with the execution of the job and a memory bus to the memory.

17. A non-transitory computer-readable recording medium having stored therein a control program for causing a computer to execute a process comprising:
storing, in the free page storage unit which divides a memory region in a memory into pages of a plurality of different page sizes and manages the divided pages, management information about an initialization state corresponding to an unused memory region in the memory;
selecting from the free page storage unit a free page of a page size according to a requested region size or a requested page size from the free page storage unit when an allocation of the unused memory region is requested; and
performing an initializing process on a memory region on which the initializing process has not been performed in a memory region corresponding to the free page using management information about the selected free page, wherein
the free page storage unit includes a page structure set in page units including a smallest page size from among the plurality of different page sizes, and
the process further comprising:
recording management information about a third page obtained by combining first and second pages in the page structure corresponding to the first page when the first and second pages having the smallest page size are free pages on which the initializing process has been performed; and
recording the management information about the third page in each of the page structures corresponding to the first and second page when any of the first and second pages is a free page on which the initializing process has not been performed.

18. The non-transitory computer-readable recording medium according to claim 17, wherein the process further comprising:
recording a size obtained by halving an initialized region size in each of the page structures corresponding to fifth and sixth pages obtained by dividing a fourth page when a page size of the fourth page matches the initialized region size indicated by the management information about the fourth page; and
storing information about the page structure corresponding to a first-half page in the fourth page as information about the page structure corresponding to the fifth page when the page size of the fourth page does not match the initialized region size, and storing information about the page structure corresponding to a second-half page in the fourth page as information about the page structure corresponding to the sixth page.

19. The non-transitory computer-readable recording medium according to claim 17, wherein the process further comprising performing an asynchronous initializing process on a memory region corresponding to the free page stored in the free page storage unit using the management information about the free page with a timing different from a timing of allocating process of a memory region, the allocating process including the initializing process.

20. The non-transitory computer-readable recording medium according to claim 19, wherein the process further comprising:
determining whether or not the free page selected from the free page storage unit is a page to be processed in the allocating process; and
suspending the asynchronous initializing process on the free page when the free page is a page to be allocated in the page allocating process.

21. The non-transitory computer-readable recording medium according to claim 19, wherein
the management information about the free page includes a control flag for control of execution of the asynchronous initializing process on the free page, and
the process further comprising
setting a suspension flag for suspending the asynchronous initializing process on the control flag when it is determined that the free page is a page to be processed in the allocating process.

22. The non-transitory computer-readable recording medium according to claim 21, wherein the process further comprising confirming whether or not the suspension flag has been set on the control flag after the asynchronous initializing process on one normal page in the free page is performed.

23. The non-transitory computer-readable recording medium according to claim 19, wherein the process further comprising:
controlling a timing at which the asynchronous initializing process is performed; and
performing the asynchronous initializing process with a first timing with which a job performed using an initialized memory region allocated by the allocating process has been completed.

24. The non-transitory computer-readable recording medium according to claim 23, wherein the process further comprising controlling the asynchronous initializing process with a second timing during a job performed using a memory region allocated by the allocating process without using a cache shared with the execution of the job and a memory bus to the memory.

* * * * *